United States Patent [19]
Ishifuji et al.

[11] Patent Number: 6,061,389
[45] Date of Patent: May 9, 2000

[54] FREQUENCY-HOPPING COMMUNICATION SYSTEM AND COMMUNICATION STATION

[75] Inventors: Tomoaki Ishifuji; Eiichi Amada, both of Tokyo; Yoshihiro Takiyasu, Higashimurayama; Genichi Ishii, Hachioji; Hidehiko Jusa; Shuichi Adachi, both of Hadano, all of Japan

[73] Assignee: Hitachi, Ltd., Tokyo, Japan

[21] Appl. No.: 08/203,373

[22] Filed: Mar. 1, 1994

[51] Int. Cl.[7] .................................................. H04B 1/713
[52] U.S. Cl. ......................... 375/202; 375/200; 380/34; 379/58; 379/59; 455/33.1; 455/53.1; 455/54.1
[58] Field of Search ............................... 375/1, 200–210; 380/34; 379/58, 59; 455/33.1, 49.1, 53.1, 54.1, 56.1

[56] References Cited

U.S. PATENT DOCUMENTS

| | | | |
|---|---|---|---|
| 4,829,540 | 5/1989 | Waggener, Sr. et al. | 375/1 |
| 5,287,384 | 2/1994 | Avery et al. | 375/1 |
| 5,329,548 | 7/1994 | Borg | 375/1 |
| 5,335,246 | 8/1994 | Yokev et al. | 375/1 |
| 5,386,435 | 1/1995 | Cooper et al. | 375/1 |
| 5,459,759 | 10/1995 | Schilling | 375/202 |

OTHER PUBLICATIONS

M. Mizuno, "The Fundamentals and Application of Spread Spectrum Communication Technologies"; Tricaps; 1987; pp. 51–68, 79–82, 93. (In Japanese).

R. Ganesh et al, "Statistics of Short Time Variations of Indoor Radio Propagation"; ICC; Jan. 1, 1991; pp. 1–5.

*Primary Examiner*—Bernarr E. Gregory
*Attorney, Agent, or Firm*—Antonelli, Terry, Stout & Kraus, LLP

[57] ABSTRACT

A frequency hopping communication system having a plurality of wireless mobile stations and at least one base station. Each wireless mobile station is operated to communicate according to a communication frame format generated by a base station. The system performing slow frequency hopping by keeping a frequency hopping interval within each frame. The hopping pattern of a frequency is designated at a field located at the tail of each communication frame by the base station.

20 Claims, 19 Drawing Sheets

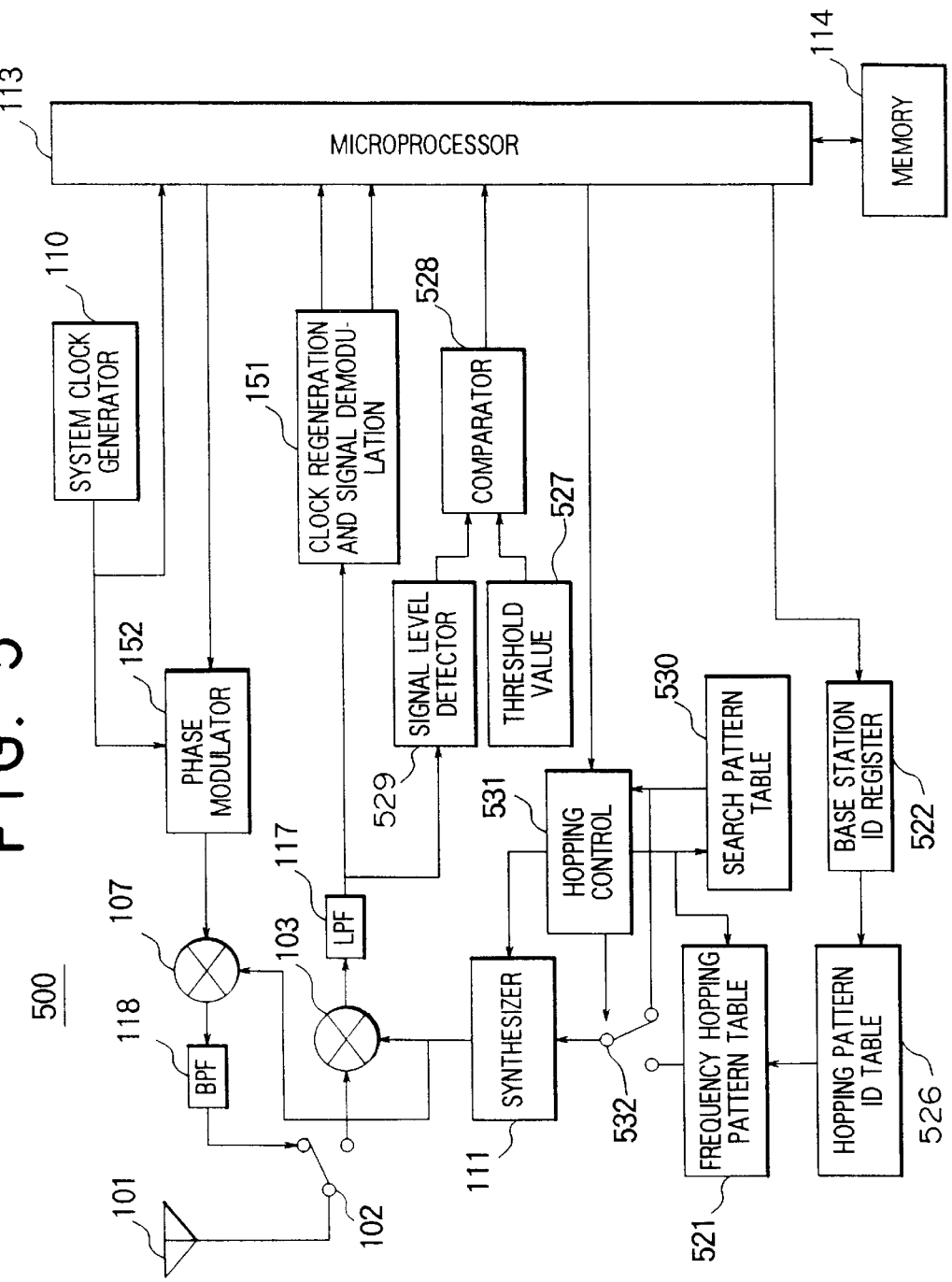

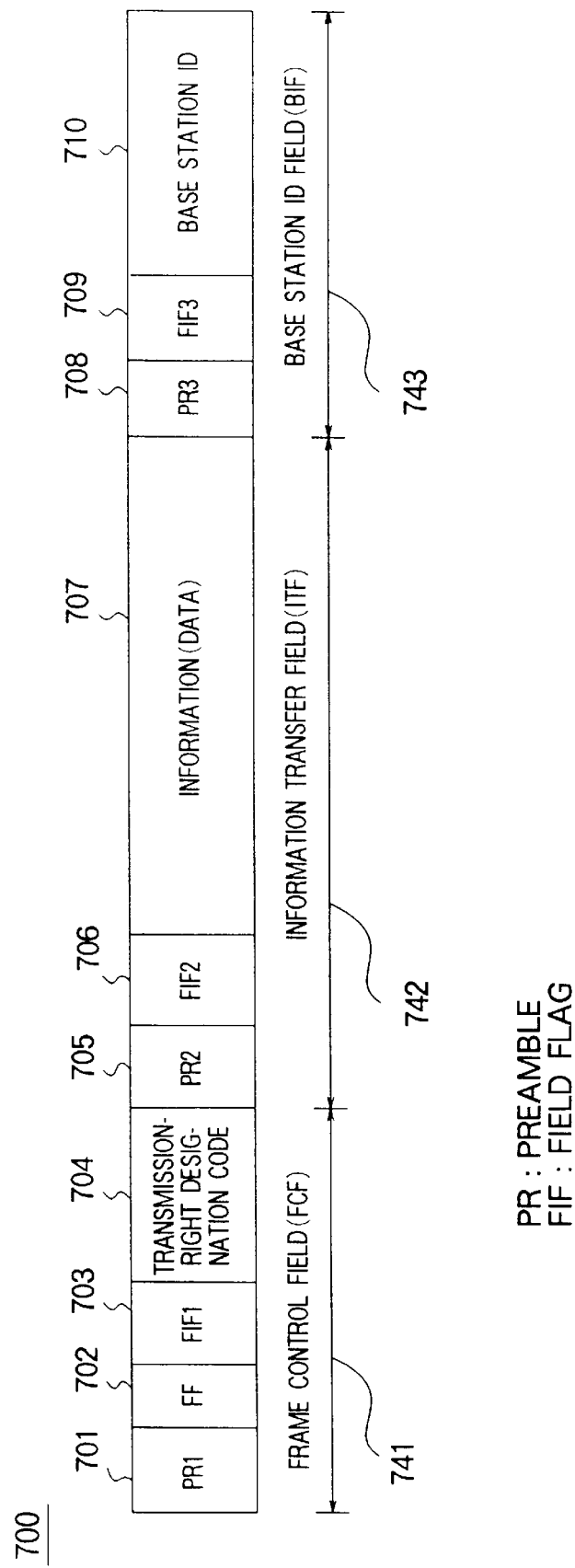

FIG. 7A

226
HOPPING PATTERN ID TABLE

| BASE STATION ID | HOPPING PATTERN ID |
|---|---|
| BS1 | HP3 |
| BS2 | HPm-1 |
| BS3 | HP1 |
| ... | ... |
| BSn-1 | |
| BSn | |

FIG. 7B

221
FREQUENCY HOPPING PATTERN TABLE

| HOPPING PATTERN ID |
|---|
| HP1 |
| HP2 |
| HP3 |
| ... |
| HPm-1 |
| HPm |

HFP2

| HOPPING FREQUENCY |
|---|
| HF11 |
| HF12 |
| HF13 |
| ... |
| HF1K-1 |
| HF1K |

HFP1

| HOPPING FREQUENCY |
|---|
| HF21 |
| HF22 |
| HF23 |
| ... |
| HF2K-1 |
| HF2K |

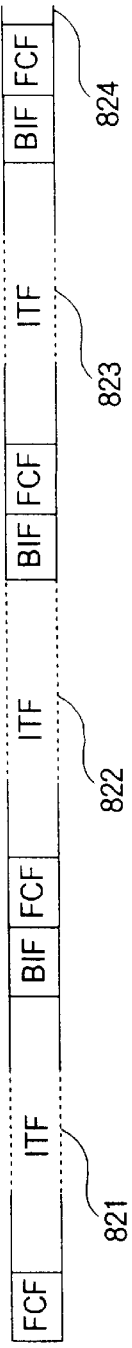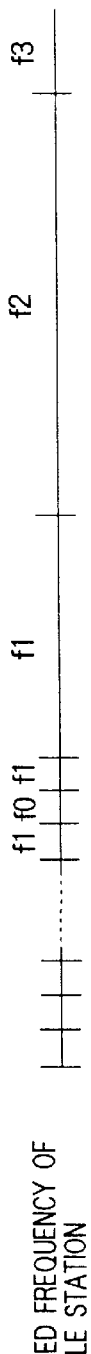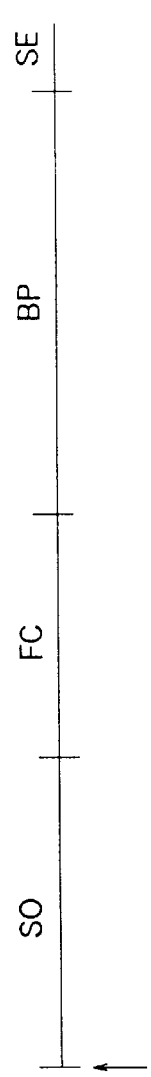
FIG. 9

FREQUENCY-HOPPING COMMUNICATION SYSTEM AND COMMUNICATION STATION

BACKGROUND OF THE INVENTION

The present invention relates to a frequency-hopping communication system arranged so that a radio communication device (station) can communicate in synchronous to communication frames generated by a base station. The communication device, and the base station can be quickly synchronized according to the communication frames transmitted in the frequency-hopping communication system.

A frequency mobile communication system needs to use an unstable transmission channel for controlling access to a mobile station. To control access to the mobile station, therefore, it is more preferable to use "centralized control" rather than "distributed control". The "centralized control" is arranged so that the base station may control plural mobile stations within a predetermined area in a concentrated manner. As an arrangement of such a centralized control, the base station generates some frames and the stations communicate with each other in synchronous to the generated frames. As one technique for improving transmission quality of unstable wireless channels, the "spread-spectrum" system may be referred to.

As the "spread-spectrum" system there are currently known two systems, "direct-sequence spread-spectrum" and "frequency-hopping spread-spectrum". The "frequency-hopping spread-spectrum" system is arranged so that the frequency of a local oscillating signal, that is, a carrier of a transmitted signal, may be hopped according to a predetermined hopping pattern during communication. This system is more robust to address a near-far problem because it is easier to arrange frequency-diversity in this system. Thus, this system is more applicable to land communications.

This kind of spread-spectrum system is discussed in the publication: "The Fundamentals and Applications of Spread-Spectrum Communication Technologies", Triceps 1987. In pages of 51 to 68 of this publication, frequency-hopping is discussed in more detail.

In general, the wireless channel is lower in quality than the wired channel. On the wireless channel, it is likely that errors occur in a burst manner. Applications using random-error-correcting codes such as BCH (Base-Chaudhuri-Hocqenghem) codes are not so effective in controlling errors. In principle, using both of the frequency-hopping system provided with a frequency-diversity effect and the error-correcting codes such as BCH codes may be effective in taking measure against the burst errors. However, for obtaining a frequency-diversity effect in the frequency-hopping system, it is necessary to make a hopping interval shorter than an allowable length of burst errors.

Based on this cause, the conventional "frequency-hopping" system, in general, means a fast frequency-hopping system in which plural hops take place within one symbol period or a slow frequency-hopping system in which about one hop takes place within some symbol periods. In these systems, basically, the duration of one frequency is so short as a few times of a symbol period.

The frequency hopping, in general, does not guarantee the continuity of phases in switching the frequency. In particular, when the continuity of the phases is only guaranteed within some symbols, it is difficult to take phase synchronization. Hence, the modulating method in which information is placed on the phase is not practical.

In general, the conventional frequency-hopping system employs an MFSK (M-ary Frequency Shift Keying) or a DPSK (Differential Phase Shift Keying) in which the phases are differentiated between the same frequencies separated from each other by one period in the hopping pattern.

One of the disadvantages a receiver arranged to use a frequency-hopping system suffers from is how the synchronization with a hopping pattern of a transmitter is quickly taken. The synchronization of the frequency-hopping system is discussed in the foregoing publication: "the Fundamentals and Applications of Spread-Spectrum Communication Technologies", pages 79 to 82 and 93.

The "frequency modulation" is inferior in frequency utilization to the phase modulation and is disadvantageous in the S/N to BER characteristic. The DPSK modulation in which the phases are differentiated between the same frequencies separated from each other by one period in the hopping pattern needs means for storing phase information the number of which is corresponding to the number of hopping frequencies for differentiating phases. Further, over the period of one cycle of a hopping pattern, the transmitter and receiver is required to hold carrier-phase synchronization at frequency. For this purpose, highly accurate clocks are maintained.

To realize for practical use of the fast frequency hopping or slow frequency hopping arranged so that one hop occurs within some symbols, a fast switchable frequency synthesizer is indispensable. In a mobile communication system arranged to realize a transmission rate of about several 100 K bps to several M bps, 1 symbol period is about 1 $\mu$s. The current technology makes it difficult to realize a small-sized, low-power and inexpensive synthesizer to be switched for such a short time.

To realize the fast synchronization, on the other hand, there are prepared the same number of components of a demodulator such as a detector and a filter as the number of hopping frequencies, which result in making the demodulator relatively redundant in arrangement. Hence, the receiver has a complicated arrangement and is very costly.

SUMMARY OF THE INVENTION

It is an object of the present invention to provide a wireless communication system which is capable of taking phase modulation to be done by coherent detection or normal differential detection so that each station (wireless communication station) can perform communication in synchronous to the frames generated by the base station as hopping carrier frequencies and may be reduced in size and power consumption.

It is a further object of the present invention to provide a communication system having a relatively simple arrangement and provides fast synchronization so that each station can perform communication in synchronous to the frames generated by the base station as hopping carrier frequencies.

It is a still further object of the present invention to provide a wireless communication station which is capable of adopting slow frequency hopping and synchronizing the frequency hopping with the base station at fast speed.

It is another object of the present invention to provide a communication frame "having a physical frame structure suited to quick synchronization process and a MAC frame structure suited to MAC (Media Access Control) process" to be applied to a communication system doing slow frequency hopping.

In carrying out the objects, according to an aspect of the present invention, the communication system for performing slow frequency hopping includes means for hopping local oscillating signal frequencies at each communication frame unit, a transmitter circuit for selectively transmitting in the air a transmission signal of each field forming the corresponding communication frame with the local oscillating carrier frequency, and a receiver circuit for receiving the signal inputted at an antenna using the local oscillating signal.

According to another aspect of the present invention, each wireless communication station has functions of generating a MAC frame at a format in which an information transfer field is located after a base station identifier (ID) field and hopping a frequency at each communication frame as switching the frequency between the base station identifier field and the information transfer field of each MAC frame.

In a preferred embodiment of the present invention, the communication frame generated by the base station has so long a length as about a fading period of a wireless interval (wireless channel) and the frequency of the local oscillating signal (carrier) is hopped at an interval corresponding to the frame length.

The frame boundary of each communication frame is defined so that the base station identifier (ID) is located at the head of the MAC frame but at the tail of the physical frame to be communicated with the wireless channel. In each communication frame (physical frame), the fields for the transmission signals are defined in the sequence of a frame control information field, an information transfer field, and a base station identifier field.

To discuss the arrangement in more detail, in the frequency-hopping communication system according to the present invention, the base station provides means for generating a signal to be transmitted in at least the frame control information field and the base station ID field of a predetermined frame structure, means for hopping a frequency of a local oscillation signal within a communication frame period, and means for transmitting the generated signal using the local oscillation signal as a carrier in the air. Each wireless communication station provides first hopping means for hopping the frequencies of the local oscillation signals at such a frequency as changing these frequencies plural times at one communication frame period at fast speed, second hopping means for hopping the frequencies at a frame period at low speed, means for receiving an input signal from the antenna using the local oscillating signals, and hopping control means for monitoring the output of the receiving means while the first hopping means are hopping the frequency of the local oscillating signal and switching the first hopping means to the second hopping means at a time when tuning the frequency of the local oscillation signal to the carrier frequency of the received signal is detected.

The first hopping means operates to hop the frequency of the local oscillating signal at such a frequency as completing hopping all the frequencies to be selected by the second hopping means within a period from when the head of one communication frame is received to when the tail of the information transfer field is received.

Further, the transmitting circuit system of each wireless communication station provides means for generating a transmitting information signal on the timing of the information transfer field of each communication frame and means for transmitting the information signal using the local oscillating signal hopped by the second hopping means as a carrier in the air through an antenna.

According to another aspect of the present invention, the base station transmits the hopping pattern identifier in place of the base station identifier. Each wireless communication station enables the second hopping means based on the hopping pattern identifier extracted from the received frame.

If the frame length is close to the fading period (about several 10 ms in the room), when the burst error takes place, the error may be localized at a few frames. This makes it possible to effectively execute error control based on frame retransmission.

According to the present invention, the frequency of the local oscillating signal is hopped at a frame period. Hence, a relatively small-sized, low-power-consumed and inexpensive synthesizer makes it possible to guarantee predetermined transmission quality.

Moreover, for example, the modulation of the transmitted signal may employ the phase modulation to be done by coherent detection or normal differential detection. Hence, the phase modulation is more advantageous in the utilization of frequency and an S/N to BER characteristic than the frequency modulation.

The communication system according to the present invention employs the slow frequency hopping system having a long hopping interval. Hence, the base station specifies the hopping pattern in the predetermined field of each communication frame with a base station identifier or a hopping pattern identifier. With the hopping pattern being specified, each wireless communication station employs simple synchronization by using a microprocessor for the purpose of synchronizing the frequency of the local oscillating signal with the frequency sent from the base station. This makes it possible to simplify the arrangement of the receiving circuit system.

According to the present invention, the frame boundary is defined so that the base station identifier or the hopping pattern identifier may be located at the head of the MAC frame or the tail of the physical frame. This makes it possible to efficiently execute both of the MAC process and the synchronization process.

The foregoing and other objects, advantages, manner of operation and novel features of the present invention will be understood from the following detailed description when read in conjunction with the accompanying drawings.

BRIEF DESCRIPTION OF THE DRAWINGS

FIG. 5 is a block diagram showing an arrangement of a wireless communication station included in the communication system according to the second embodiment of the present invention;

FIG. 6 is a view showing a frame structure used in the second embodiment of the present invention;

FIG. 7A is a view showing a structure of a hopping pattern ID table provided in each base station and each wireless communication station included in the second embodiment of the present invention;

FIG. 7B is a view showing a frequency hopping pattern table provided in each base station and each wireless communication station included in the second embodiment of the present invention;

FIG. 9 is a view showing a start location of the synchronization process and time passage of the state transition;

DESCRIPTION OF THE PREFERRED EMBODIMENTS

Figure 1:
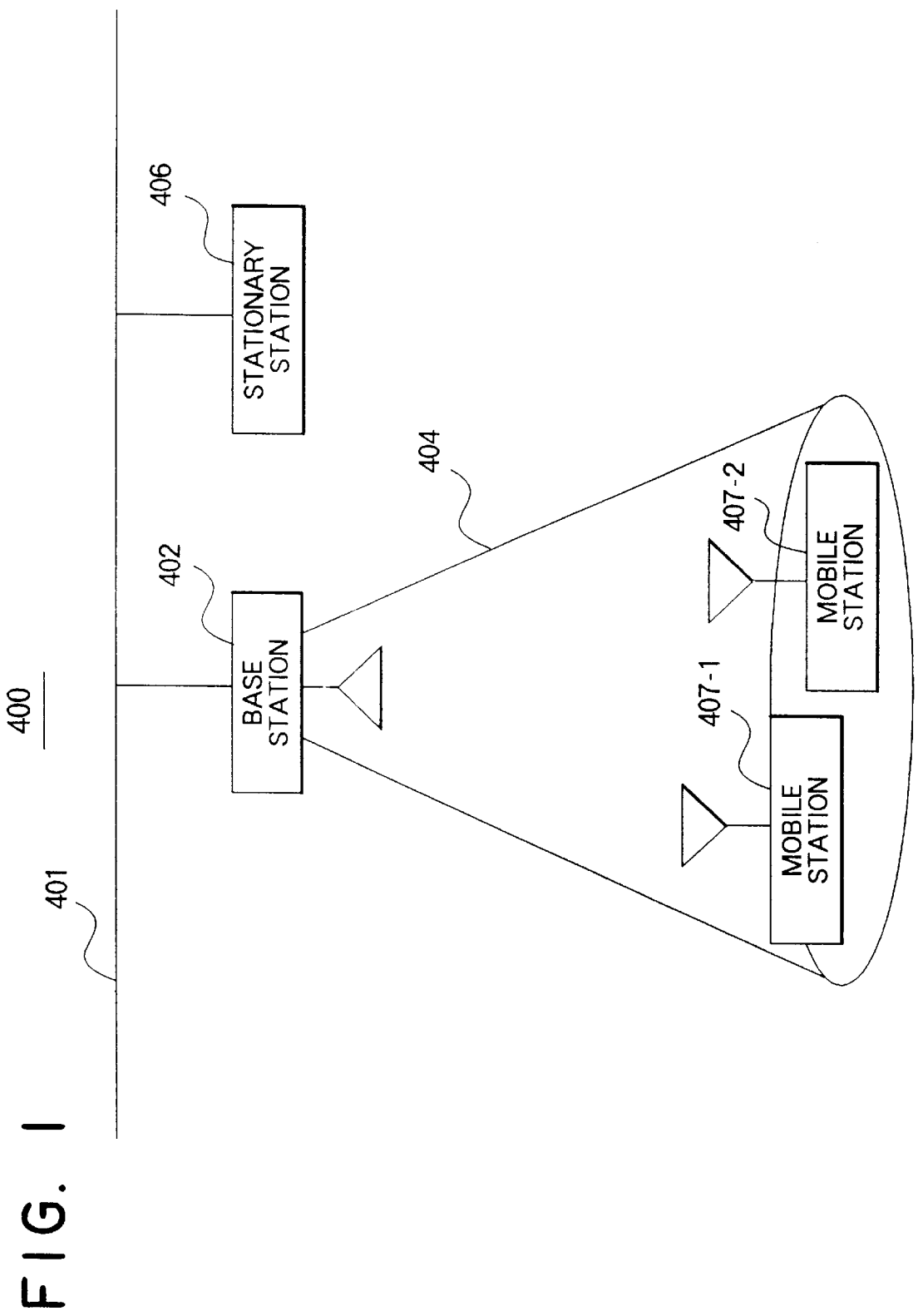
FIG. 1 is a view showing a communication network to which the present invention may apply.

FIG. 1 shows a network system including a slow frequency-hopping communication system according to an embodiment of the present invention.

A numeral 400 denotes a network system which is arranged to have a base station 402, a stationary communication station (referred to as a stationary station) 406, and a wired channel 401 connecting both with each other. To simplify the figure, just one base station 402 and one stationary station 406 are shown. In actual, plural base stations 402 and plural stationary stations 406 are connected on the channel 401.

The base station 402 forms a cell 404 within the reach of the radio wave so that the base station 402 may communicate with plural mobile stations or wireless stations 407 (407-1, 407-2, . . . ) located inside of the cell 404.

Each mobile communication station (referred to as a mobile station) 407 operates to communicate with another mobile station, a stationary station or a base station in synchronous to the frames generated by the base station 402. The communication between the mobile station 407 and the stationary station 406 is executed through the base station 402 and the wired channel 401.

Figure 2:
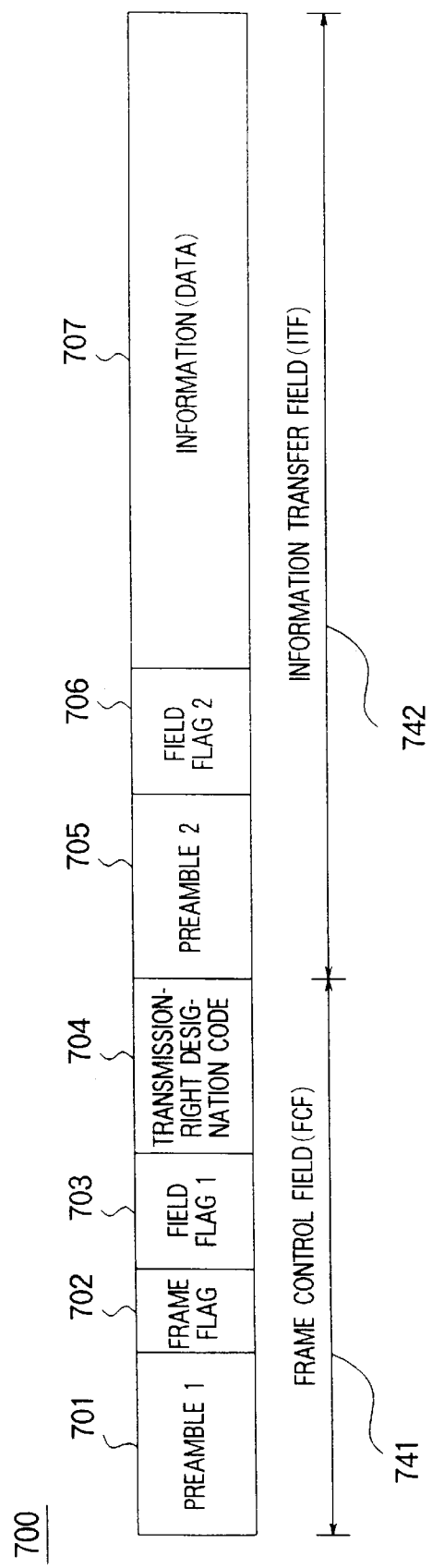
FIG. 2 is a view showing a structure of a communication frame used in a first embodiment of the present invention.

FIG. 2 shows an embodiment of a frame structure used in the communication between the mobile stations 407 or between the stationary station 406 and the mobile station or between the base station and the mobile station in the system according to the present invention.

One frame is composed of seven fields, that is, a preamble (1) 701, a frame flag 702, a field flag (1) 703, a transmission right designation field 704, a preamble (2) 705, a field flag (2) 706, and information (data) field 707. The contents of a frame control field (FCF) 741 consisting of the fields 701 to 704 is transmitted by the base station 402. The contents of an information transfer field (ITF) consisting of the fields 705 to 707 is transmitted by the base station 402 or any one of the mobile stations 407-1, 407-2 specified by the set value of the transmission right designation field 704.

Numerals 701 to 706 denote control information used for accessing the channel. The transmission data is communicated in the field 707. An error-correcting code for detecting a data error is set in the field 704 or 707. In a case that the mobile station 407 detects an error of data in the field 704, the transmission right is regarded to be in the base station. In a case that the mobile station 407 detects an error of data in the field 707, NAK is given back using a part of the field 707 in the succeeding frame. If no error is detected, ACK is given back.

If the frame length is as long as about a fading period, burst errors are localized in some specific frames. The error control based on the retransmissions makes it possible to effectively improve the transmission quality. For example, in the writing "Statistics of Short Time Variations of Indoor Radio Propagation" ICC' 91.1.1, the indoor maximum Doppler frequency is about several tens Hz and the fading period of the channel is about several tens ms. By setting the frame length as several tens ms, therefore, burst errors can be localized on some specific frames. If an erroneous frame takes place, the error control should be done by retransmitting the same data frame.

Figure 3:
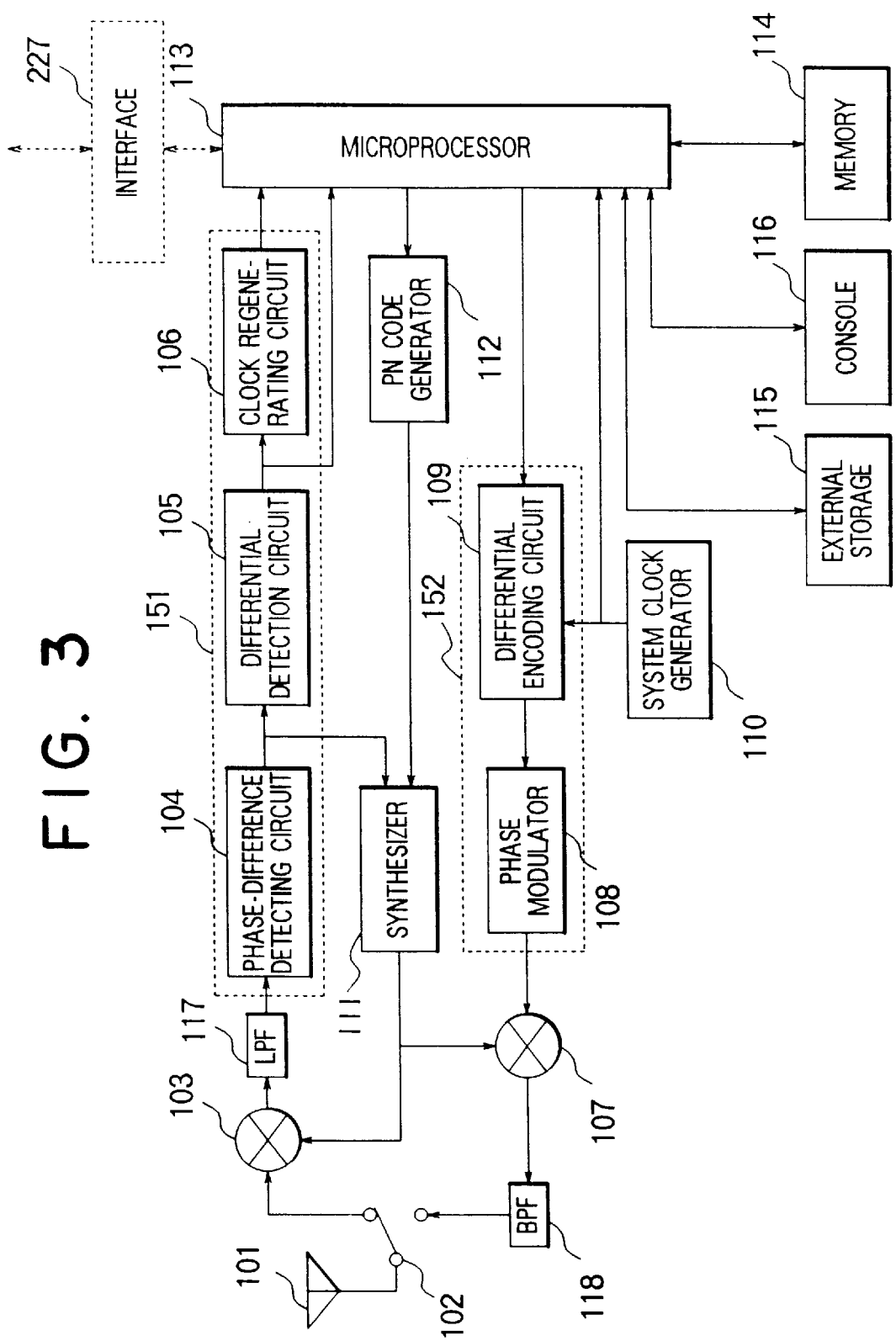
FIG. 3 is a block diagram showing an arrangement of a wireless communication station included in the communication system according to the first embodiment of the present invention.

FIG. 3 is a block diagram showing an embodiment of a structure of the mobile station 407.

In this embodiment, the structure of the base station 402 is analogous to that of the mobile station 407. The different respect between them is that the base station 402 provides an interface 227 between a microprocessor 113 and a wired channel 401. In the following description, therefore, the operation of the base station will be described with reference to FIG. 3.

In FIG. 3, a numeral 101 denotes an antenna. The antenna 101 is operated as a receiving one if a switch 102 is connected to a mixer 103 or as a transmitting one if it is connected to a bandpass filter 118.

At first, the description will be oriented to the receiving operation.

A modulated signal received at the antenna 101 is applied to the mixer 103 through the switch 102. The modulated signal is mixed with a local oscillation frequency outputted from a synthesizer 111 having the same oscillation frequency as a center frequency of the modulated signal. Then, the base band signal is extracted from the mixed signal through the effect of a lowpass filter 117.

A numeral 104 denotes a phase difference detecting circuit, which operates to remove a phase displacement having a magnitude of $\pi$ per one symbol, caused by the BPSK phase modulation, measure a phase rotation per a unit time of the base band signal, and correct the oscillation frequency of the synthesizer 111.

A numeral 105 denotes a differential detection circuit, which operates to pick up a digital demodulated signal of "1" or "0" based on whether or not the phase displacement has a magnitude of $\pi$ per one symbol.

A numeral 106 denotes a clock regenerating circuit, which provides a PLL inside of itself and operates to detect the timing of output changes of the differential detection circuit 105 and take phase synchronization with the PLL on the timing for generating the received clock.

The microprocessor 113 operates to read the demodulated digital signal according to the extracted received clock and store the digital signal in a memory 114. The received data stored in the memory 114 is saved in an external storage 115 if necessary.

Next, the description will be oriented to the transmitting operation.

The microprocessor 113 operates to transfer the data read out of the memory 114 or the external storage 115 to a differential encoding circuit 109 according to the system clock generated by a circuit 110.

The differential encoding circuit 109 takes an exclusive OR between a data value received from the microprocessor 113 and data outputted to a phase modulator at the previous symbol and outputs the exclusive OR result as a new output. The phase modulator 108 operates to synthesize a BPSK base band signal from the output of the differential encoding circuit 109 and apply the base band signal into the mixer 107.

The mixer 107 operates to mix the base band signal with the local oscillation signal outputted from the synthesizer 111 and generate a phase-modulated signal having the same center frequency as the oscillation frequency of the synthesizer 111. The phase-modulated signal is outputted from the antenna 101 through the bandpass filter 118 and the switch 102 and is sent as a radio signal.

A numeral 112 denotes a PN code generator, which operates to generate a frequency-hopping pattern according to the pseudo random noise codes in response to an indication given by the microprocessor 113 at any time of the receiving time or the transmitting time and hop the oscillation frequency of the synthesizer 111. The base station 402 for managing the mobile station(s) 407 located inside of a cell and the cell itself has a pre-specified common frequency hopping pattern so that the base station 402 and the mobile station(s) 407 may do hopping in synchronization for transmitting or receiving the signal with the same frequency.

In the base station 402, the interface 227 is connected between the wired channel 401 and the microprocessor 113. In the communication between the mobile station 407 and the mobile station outside of the cell, the base station relays the communication through the interface.

In the mobile station 407 and the base station 402, an operator may give control indications such as start or stop of the communication and change of the frequency hopping pattern through an input unit 116 like a console.

Next, the description will be oriented to the function of each field in the frame shown in FIG. 2 according to the operation of the base station 402.

The base station 402 operates to switch the frequency of the synthesizer 111 according to the predetermined frequency-hopping pattern and then transmit the preamble (1) 701, a frame flag 702 indicating the head of the frame, and a field flag (1) 703 indicating that the succeeding field is a transmission right designation field.

Then, a station ID is transmitted to the field 704. The station ID is used for specifying one of "the mobile stations 407-1, 407-2 and the base station 402" all having a transmission right against the information field 707 of the frame.

If the station ID of the base station itself is transmitted to the transmission right designation field 704, in succession, the base station 402 operates to transmit the preamble (2) 705, the field flag (2) 706 indicating that the succeeding field is information field, and the contents of the information field 707 to the mobile station.

If the station ID of the mobile station 407-1 or 407-2 is transmitted to the field 704, the base station 402 shifts to the receiving mode, receives the preamble (2) 705 transmitted by the mobile station 407 for taking the bit synchronization and then receives the field flag (2) 706 and the succeeding information field 707.

When receipt or transmission of the information field 707 is terminated, the base station 402 operates to switch the frequency of the local oscillation signal outputted from the synthesizer 111 into a new frequency according to the preset frequency hopping pattern and repeat the same operation as stated above.

In turn, the description will be oriented to the function of each field in the frame through the operation of the mobile station 407.

The mobile station 407 operates to switch the output frequency of the synthesizer 111 according to the predetermined frequency hopping pattern, receive the preamble 701 transmitted by the base station 402 for taking bit synchronization with the preamble 701, and then receive the frame flag 702 for taking frame synchronization with the flag. In receipt of the field flag (1) 703, the mobile station 407 recognizes that the field following the flag is a transmission right designation field 704 and then receives the contents of the field.

The mobile station 407 operates to switch to a transmission mode if the transmission right designation field 704 has a value corresponding to the station ID of the station 407 itself. Then, the mobile station 407 transmits the preamble (2) 705, the field flag (2) 706 and the contents of the information field 707 after the field 704 is received.

If the field 704 has a value corresponding to a station ID of the base station 402, to receive the data transmitted from the base station 402, the mobile station 407 operates to receive the preamble (2) 705, the field flag (2) 706 and the contents of the information field 707.

On the termination of transmission or receipt of the information field 707, the mobile station 407 operates to switch the output frequency of the synthesizer 111 to a new one according to the predetermined frequency hopping pattern. Then, the aforementioned operation is repeated.

Next, the description will be oriented to a slow frequency hopping communication system according to a second embodiment of the present invention.

Figure 4:
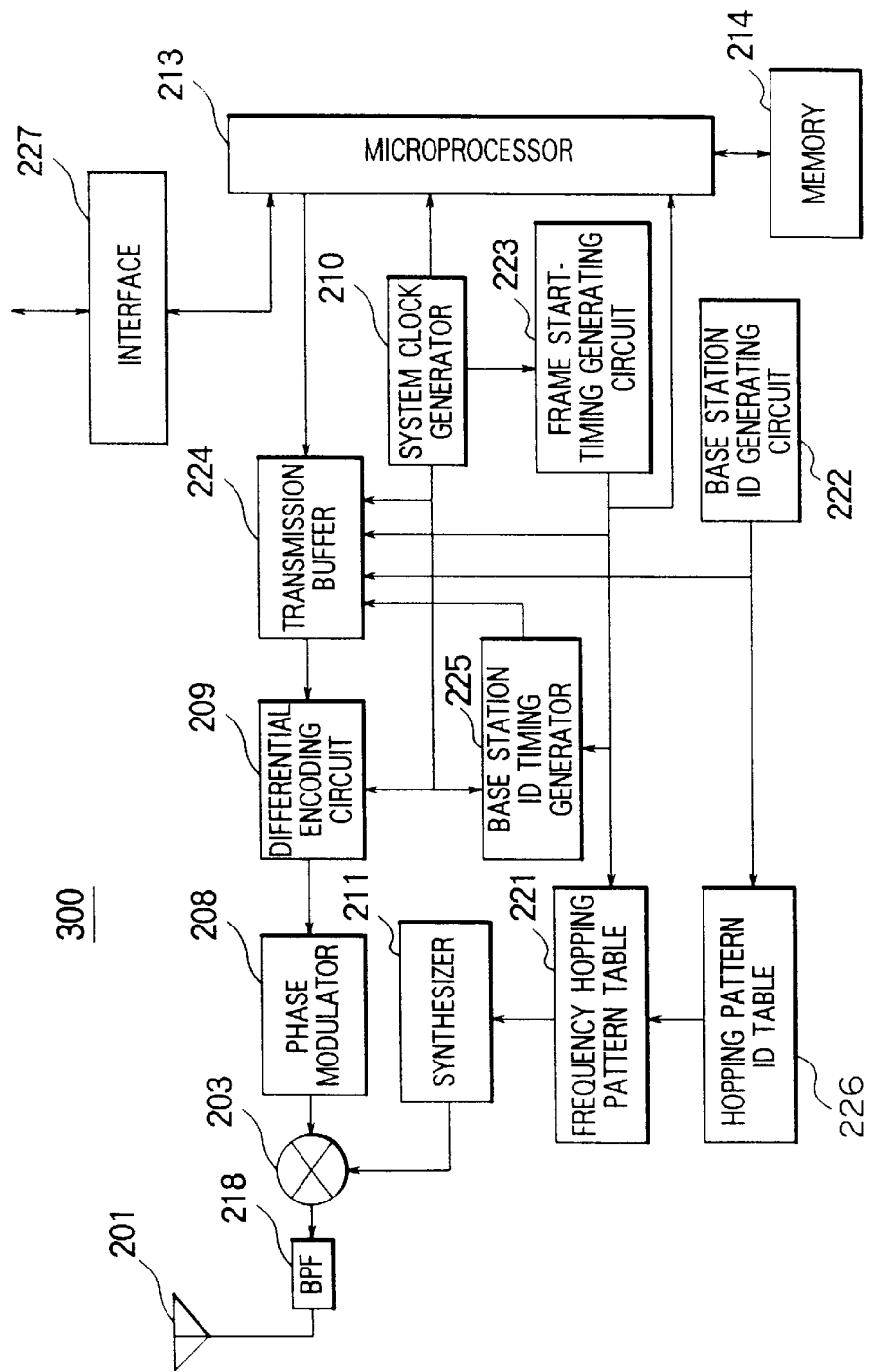
FIG. 4 is a block diagram showing an arrangement of a base station included in the communication system according to a second embodiment of the present invention.

FIG. 4 shows an arrangement of a base station 300 according to the second embodiment. FIG. 5 shows an arrangement of a mobile station 500 which communicates with the base station 300. FIG. 6 shows a frame 700 created by the base station 300.

The communication system according to the second embodiment is characterized in that no mobile station 500 knows a hopping pattern of the base station in advance. To obtain the hopping pattern of the base station, therefore, each mobile station 500 derives the hopping pattern from the base station ID inside of the frame through the effect of the quick synchronization process (to be described later).

At first, the frame structure shown in FIG. 6 will be described.

The contents of the fields 701 to 704 and 708 to 710 are transmitted by the base station 300. The contents of the fields 705 to 707 are transmitted by the base station 300 or the mobile station 500. The fields where the data are outputted, except the information field 707, contain control information for accessing a wireless channel.

The mobile station 500 receives the preamble (1) 701 transmitted by the base station 300 for taking bit synchronization with the preamble (1) 701. Then, it receives the succeeding frame flag 702 for taking frame synchronization with the flag 702.

The base station 300 operates to transmit the field flag (1) 703 indicating that the transmission right designation field 704 follows the flag itself and then the contents of the transmission right designation field 704. In the field 704, a station ID is contained for designating one mobile station having a right of transmission in the information field 707 of the current frame.

Of the plural mobile stations for receiving the frames from the base station 300, the mobile station 500 having an ID designated by the field 704 operates to transmit the preamble (2) 705, the field flag (2) 706 indicating that the succeeding field is an information field, and then the data to be inputted to the information field 707.

After the data for the information field, the base station 300 operates to transmit the preamble (3) 708 and the field flag (3) 709 indicating that the succeeding field is a base station ID field. The base station ID for defining a frequency hopping pattern is transmitted through the succeeding base station identifier field. Then, transmission of one frame is terminated.

The base station 300 and the mobile station 500 operate to refer to a hopping pattern ID table and a frequency hopping pattern table with the base station identifier 710 as an index for defining the next hopping frequency.

After changing the frequency, the base station 300 starts to transmit a new preamble (1) of the next frame. In the following frames, the foregoing operations of the base station 300 and the mobile station 500 will be repeated.

In turn, the description will be oriented to the arrangement and the operation of the base station 300 with reference to FIG. 4.

The base station 300 is controlled by a microprocessor 213 which is operated on the clocks generated by a system clock generator 210. A numeral 223 denotes a circuit for counting one frame period by using the clocks of the system clock generator 210 and periodically generating a frame-start timing signal. The generated timing signal is supplied to a transmission buffer 224, a frequency hopping pattern table 221, a base station ID timing generator 225, and a microprocessor 213.

The microprocessor 213 operates to recognize the bit location inside of the frame by counting the system clock from the frame-start timing signal and send the contents (bit patterns) of the fields 701 to 704 and the fields 708 to 710 as shown in FIG. 6 out to the transmission buffer 224 according to the recognized bit location.

The readout address of the transmission buffer 224 is initialized to a buffer head address in response to the frame-start timing signal. Then, the address is incremented each time the system clock is generated by the circuit 210. On the next frame-start timing, the address returns to the buffer head address again. The data stored in the transmission buffer 224 is sequentially read out on the readout address and then is fed to the differential encoding circuit 209.

By counting the system clock with the frame-start timing signal as a start point, the base station ID timing generator 225 operates to recognize the output timing of the base station ID field 710 of the frame and generate the timing signal at the head of the field 710. With this operation, the base station ID obtained from the base station ID generator 222 is inputted into the transmission buffer 224.

The frequency hopping pattern table 221 operates to design the next hopping frequency to the synthesizer 211 in response to the frame-start timing signal. With the designation, at the head of the frame, the frequency of the local oscillation signal outputted from the synthesizer 221 is hopped.

The hopping pattern table 221 prepares plural kinds of hopping patterns in advance. With the base station identifier outputted from the circuit 221 as an index, one hopping pattern identifier read out of the hopping pattern ID table 226 is fed to the hopping pattern table 221. As such, the frequency of the synthesizer 211 is switched to a new one according to the hopping pattern corresponding to the hopping pattern ID. By changing the base station identifier, the hopping pattern is allowed to be changed.

In the differential encoding circuit: the data sequentially read out of the transmission buffer 224 is exclusive ORed with the value outputted to the phase modulator 208 at the previous symbol. With the exclusive ORed value, the new output value at this symbol is defined.

The output of the differential encoding circuit 209 is converted into the BPSK base band signal through the effect of the phase modulator 208. Then, the BPSK base band signal is applied to the mixer 203. The mixer 203 operates to modulate the local oscillation signal (carrier) generated by the synthesizer 211 into the BPSK base band signal. The modulated signal outputted from the mixer 203 is fed to the antenna 201 through a bandpass filter 218 so that the signal may be radiated as an electromagnetic wave in the air.

The base station 300 enables to communicate with other stations located outside of the cell through the interface 227 with a wired channel.

In FIG. 4, the arrangement of the receiving part is not shown. The base station includes the receiving part arranged in the same manner as the receiving parts (103, 117, 151) shown in FIG. 3.

FIG. 7A shows a structure of the hopping pattern ID table 226. FIG. 7B shows a structure of a frequency hopping pattern table 221.

The hopping pattern ID table 226 is a translation table for deriving a frequency hopping pattern ID HPi from the base station ID BSi. The frequency hopping pattern table 221 is a translation table for deriving a set (hopping patterns) HFPi of hopping frequencies from the hopping pattern ID HPi.

In the illustration of FIG. 7A, n base station identifiers BS1 to BSn are prepared. For example, the base station identifier BS1 corresponds to the frequency hopping pattern identifier "HP3". The BS2 corresponds to "HPm-1". The BS3 corresponds to "HP1".

As shown in FIG. 7B, the hopping pattern "HFP1" for the frequency hopping pattern identifier "HP1" consists of a set of frequencies HF21, HF22, . . . HF2k. The hopping pattern "HFP2" for the frequency hopping pattern identifier "HP2" consists of a set of frequencies HF11, HF22, . . . , HF1k.

When the mobile station 500 as shown in FIG. 5 receives a frame (see FIG. 6) transmitted by the base station 300, the microprocessor 113 extracts a proper base station identifier to the base station from the base station ID field 710.

The base station identifier is set to a base station ID register 522. With the similar method to the base station, the hopping frequency to be designated to the synthesizer 111 is derived by using a hopping pattern ID table 526 and a frequency hopping pattern table 521.

The hopping pattern ID table 526 and the frequency hopping pattern table 521 have the same arrangements as the base station as shown in FIG. 7.

While the mobile station 500 is operated in synchronous to the base station, a hopping control 531 operates to turn a switch 532 to a search pattern table 530. In this case, the frequency of the local oscillation signal outputted from the synthesizer 111 is sequentially switched according to the frequency search pattern for establishing the synchronization, which is outputted from the search pattern table 530. During this interval, the signal power received at an antenna 101 is measured by the signal level detector 529. The power level of the received signal is compared with a predetermined power threshold outputted from a threshold value circuit 527 in a comparator 528. The comparison results in being able to sense the carrier and capture a base station signal.

In turn, the description will be oriented to a fast synchronizing algorithm for synchronizing the mobile station 500 with the frame created by the base station 300.

Figure 8:
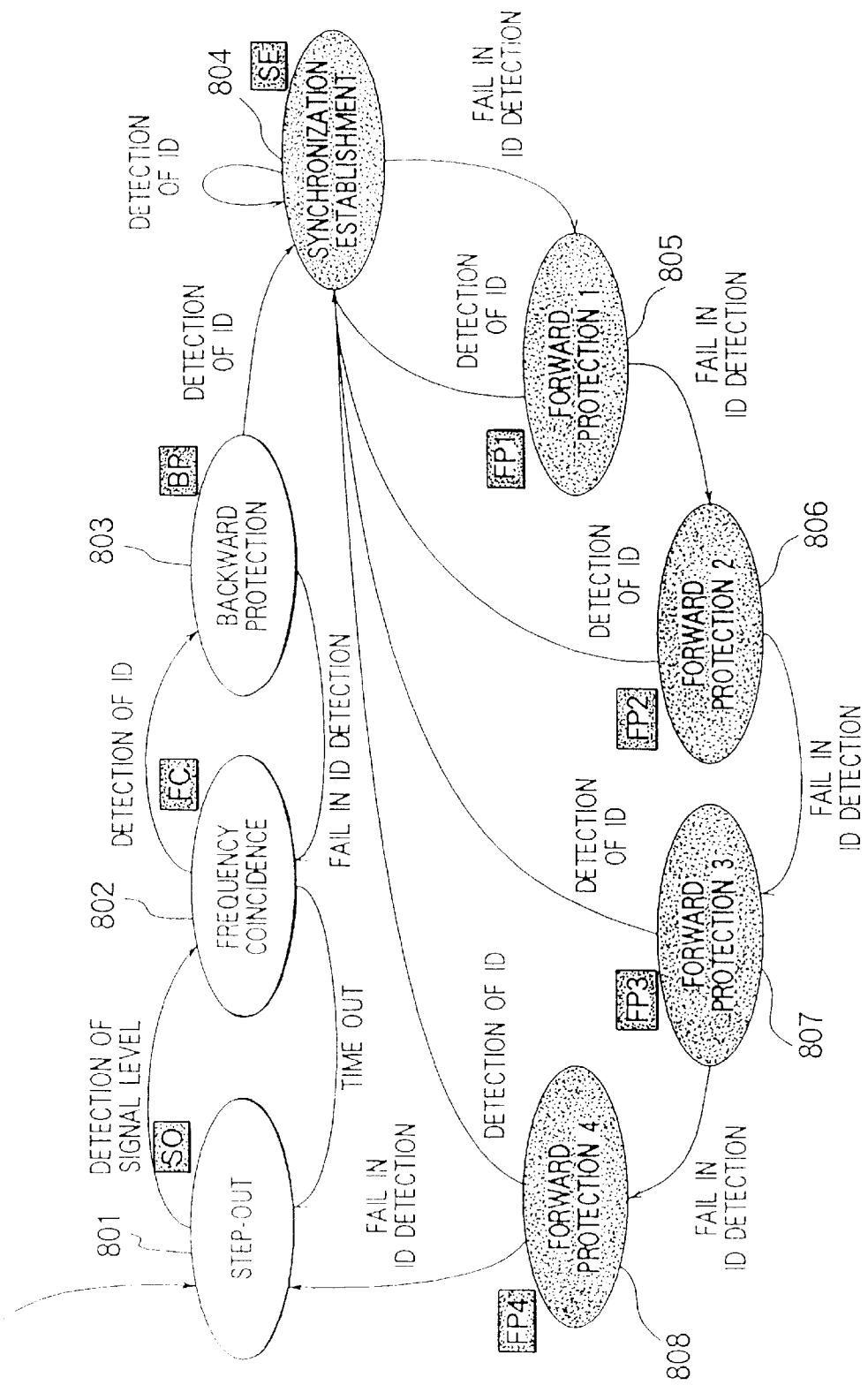
FIG. 8 is a view showing a state transition of synchronization process in the communication system according to the present invention.

FIG. 8 shows a state transition in the synchronizing process.

In the initial state, the process stays in a "step-out (SO)" 801. In the process of establishing the synchronization, the backward two stages and the forward five stages (to be described later) are protected.

The mobile station 500 senses a level of the received signal as the local oscillation frequencies for receipt are hopped in sequence. When the sensed signal level is higher than a predetermined threshold value, the state is transited from "SO" to "Frequency Coincidence (FC)" 802. In the state "(FC)", the hopping operation of the local oscillation frequency is stopped so that the receiving operation may be continued as the signal level is kept higher than the threshold value.

When a field flag (3) 709 noticing the base station ID is sensed from the received bit pattern, the mobile station 500 extracts the content of the succeeding base station ID field 710 and stores it in the memory 114. At this time, the state is transited from "FC" to "Backward Protection (BP)". When the process is in the state "FC", the mobile station continues to monitor the level of the received signal. If the level of the received signal is kept lower than the threshold value for a predetermined time or more, it is recognized as a timeout, when the process returns to the state "SO".

When the process transits to the state "BP", the mobile station operates to set the extracted base station ID to the base station ID register 522. The next hopping frequency is derived from the current value of the local oscillation frequency through the effect of the hopping pattern ID table 526 and the frequency hopping pattern table 521. The frequency of the local oscillation signal outputted from the synthesizer is hopped in the boundary of the frame.

Further, if the base station ID is extracted from the base station ID field 710 of the next frame and is determined to coincide with the base station ID of the previous frame stored in a memory 514, the state is transited to "Synchronization Establishment (SE)" 804. If the base station ID cannot be extracted in the scheduled field of the frame or both of the base station IDs do not coincide with each other, the state returns to "FC" because the ID is not sensed.

When the state is transited to the state "SE", the mobile station 500 starts to communicate with another mobile station or the base station by using the synchronized frame generated by the base station.

When the state is in "SE", the base station ID is extracted from each frame and it is occasionally checked whether or not the extracted ID coincides with the base station ID stored in the memory 514. If both of the IDs do not coincide with each other, the state is transited to "Forward Protection 1 (FP1)" 805 because no same ID is detected.

Each time the same ID is not detected, the state is sequentially transited from "Forward Protection 2 (FP2)" 806 to "Forward Protection 4 (FP4)" 808 until the occurrence time of non-detection reaches predetermined times (four in this embodiment). If the received base station ID coincides with the base station ID stored in the memory 514 even once in the process, the state is transited to "SE" 804 again.

If the continuous N (N=5 in this example) mismatches occur from the state "SE", the state is transited to "SO".

Later, the foregoing transition process for synchronization will be concretely discussed in detail.

FIG. 9 shows the process in which the mobile station 500 starts the synchronization on the way of the information transfer field 742 (ITF: 705 to 707) of the frame shown in FIG. 6. The synchronization to be executed by the mobile station is itemized as follows.

(1) In the state "SO", the level of the received signal is measured as the received frequency is hopped. If the received signal level of the frequency f1 is sensed on the way of the frame 822, the state is transited to "FC".

(2) The frequency hopping is stopped and the base station ID field of the frame 822 (BIF: 708 to 710) is received, when the state is transited to "BP". The frequency of the next frame 823 is established on the base station ID inside of the received BIF. Then, the frequency is hopped to f2 at the head of the frame.

(3) In receipt of the BIF of the frame 823, the state is transited to "SE" in which the synchronization is established. Then, the hopping frequency of the next frame 824 is derived so that the frequency may be hopped at the head of the frame.

Figure 10:
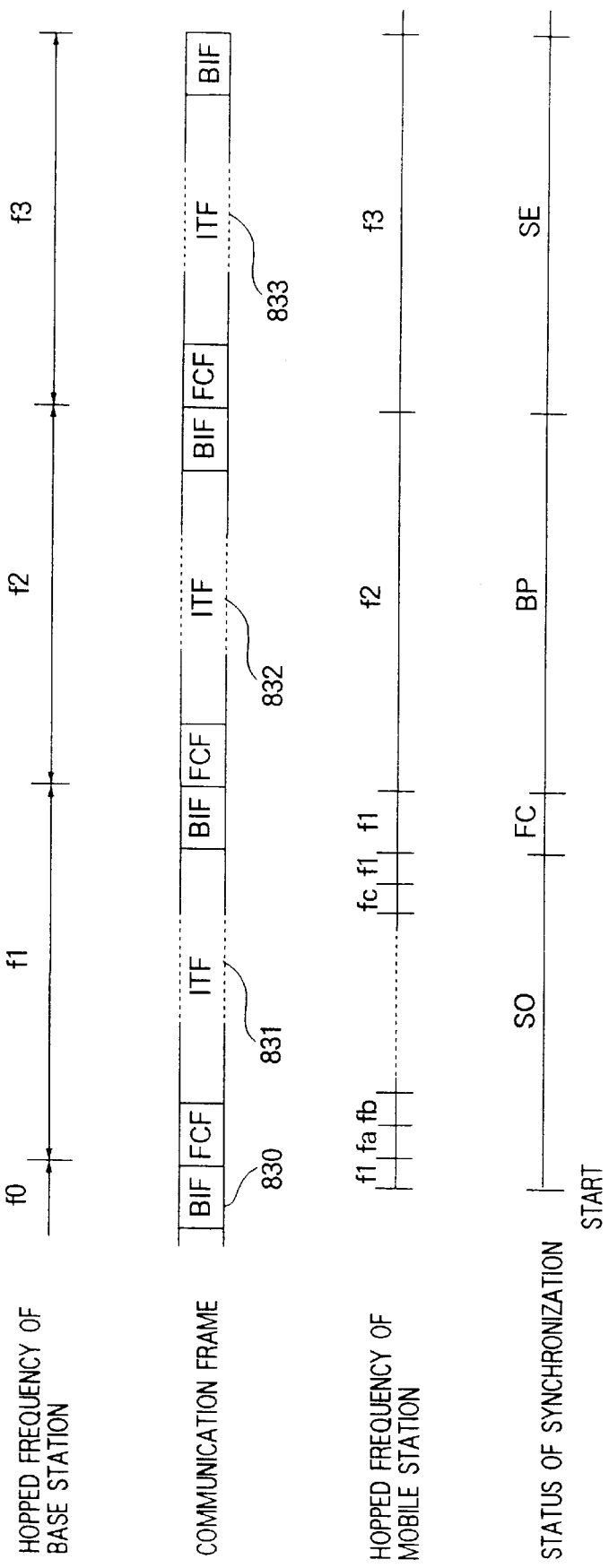
FIG. 10 is a view showing another example of a start location of the synchronization process and time passage of the state transition.

The state shown in FIG. 10 is as follows. That is, since the frequency of the mobile station 500 is hopped to the frequency f1 immediately before the start of the frame 831, that is, the frame 830 of the frequency f0 is switched to the frame 831 of the frequency f1, the frequency of the frame is switched from f0 to f1 while the received signal level is being measured at the frequency f1. As a result, the coincidence time at the frequency f1 is too short to detect the received signal level. In FIG. 10, fa to fc indicate frequencies except f1.

In this state, if the transition to the state "FC" is in time for the BIF of the frame 831, the state is allowed to be transited to "BP" at the head of the next frame 832. Hence, the frequency hopping for sensing the frame frequency is required to keep such a scan speed or hopping interval as completing re-measurement at least at the first hopping frequency when the scan of all of hopping frequencies is terminated, that is, at least times corresponding to "all hopping frequencies treated by the hopping pattern table 521+1 frequency", until when the head of the frame is received to when the head of the BIF is received. This makes it possible to reduce a period of step out of synchronization, thereby quickly starting the communication.

Figure 11:
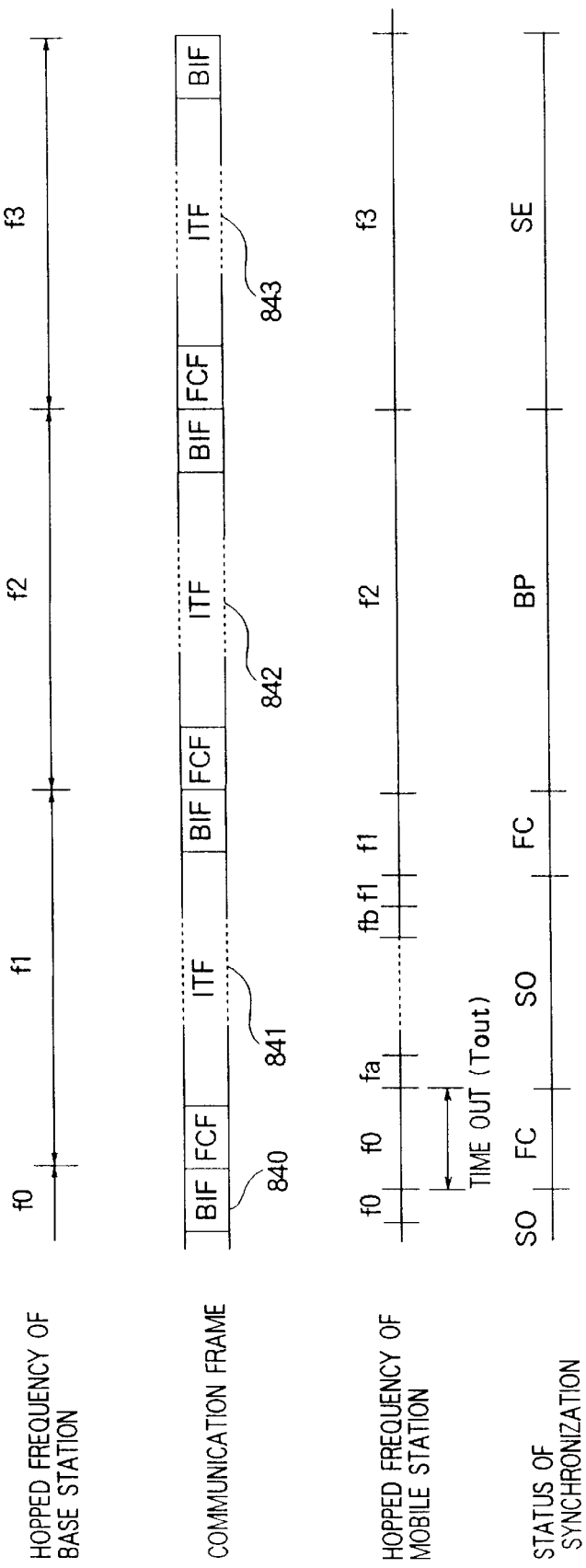
FIG. 11 is a view showing another example of a start location of the synchronization process and time passage of the start transition.

The state shown in FIG. 11 is as follows. That is, the mobile station 500 hops the frequency to f0 at the tail of the frame 840 of the frequency f0. Hence, though the detection of the received signal level is successful, the mobile station 500 is not in time for the receipt of the BIF of the frame.

In this state, since the detection of the received signal level at the frequency f0 is successful, the state is temporarily transited to "FC". Then, a predetermined timeout time (Tout) is set to have a far longer time than "1"(the noise bandwidth of the transmission channel). During the interval (Tout), the hopping is stopped so that the detection of the received signal level may be tried at a fixed frequency of f0. If the unsuccessful detections of the received signal level continuously occur, the state returns to "SO" again when the unsuccessful state continues for the timeout time (Tout) or longer. Then, the synchronization procedure is restarted from the start.

The noise bandwidth of the transmission channel normally keeps the same level of the bandwidth of the information signal. Hence, the timeout time (Tout) may be set to have a far longer time than a symbol period of an information signal.

In the restarted synchronization, if the transition to the state "FC" is in time for the BIF of the frame 841, the state may be transited to "BP" at the head of the next frame 842. To cope with the special case indicated herein, therefore, the period or frequency of the frequency hopping is required to be designed so that the frequency hopping of at least "all of hopping frequencies+one frequency" may be terminated during a shorter period than the necessary time from the head of one frame to the head of the BIF field by one timeout time. This makes it possible to measure the received signal level at each frequency. In the state, it will be understood that the communication may be quickly started.

By considering the foregoing embodiments shown in FIGS. 10 and 11, the frequency of the frequency hopping at the state "SO" may be designed so that the frequency hopping of at least "all of hopping frequencies+one frequency" for a shorter period than the necessary time for receiving the signal from the head of the frame to the head of the BIF by one timeout time.

It will be understood from this synchronization that the mobile station may synchronize with the frame created by the base station within three frames later than the start of the synchronization.

Next, the description will be oriented to the program flowcharts on which the mobile station 500 enables to realize the foregoing synchronization. These programs are pre-stored in the memory 114 and are executed by the microprocessor 113.

Figure 12:
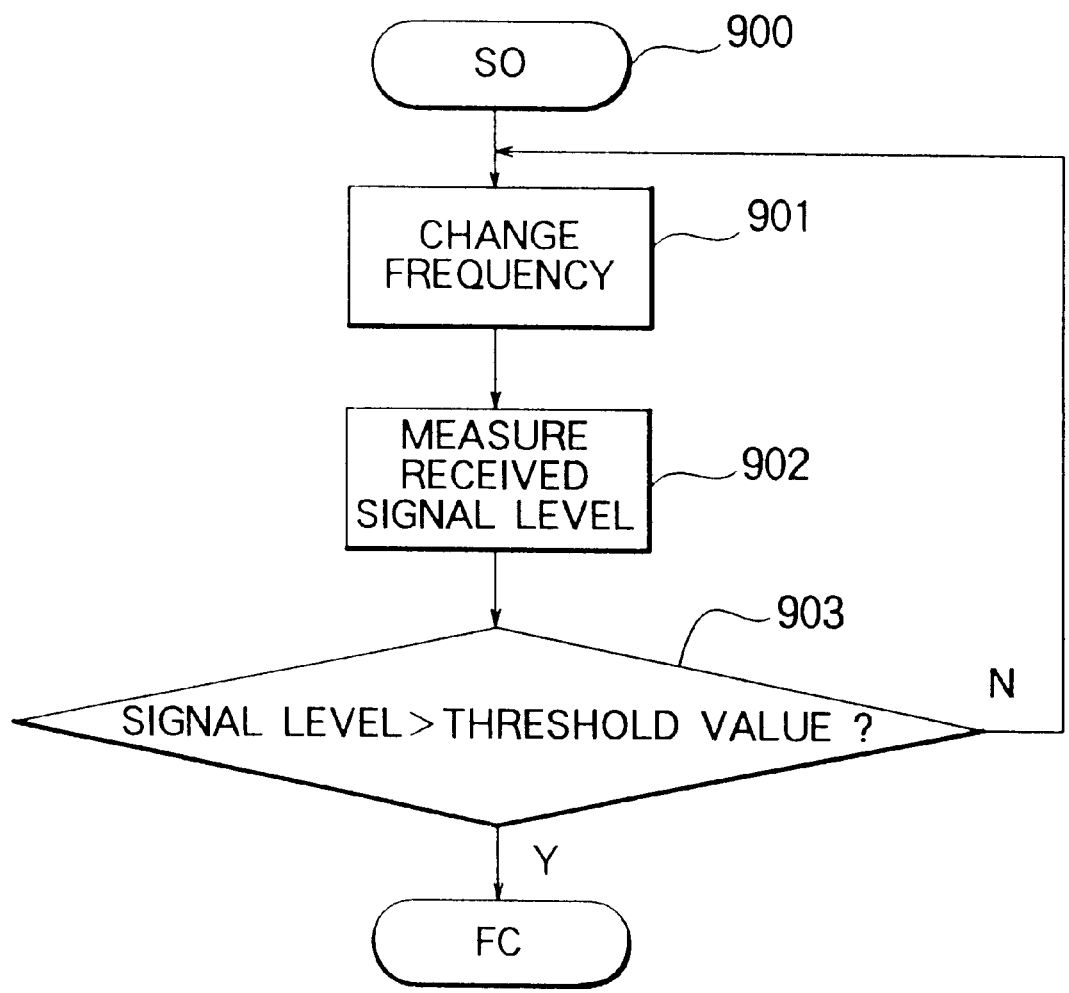
FIG. 12 is a flowchart showing a process in the state "SO"

FIG. 12 is a flowchart showing a program executed in the state "SO" 900.

An instruction is given to the hopping control 531 so that one frequency may be set to the synthesizer on the timing of a load signal. The frequency is read out of the frequency table contained in the search pattern table 530 (step 901). The circuit 529 measures the received signal level (step 902). If the output of the comparator 528 indicates that the measured level of the received signal is larger than the preset threshold value (step 903), the state is transited to "FC". If the measured level of the received signal is equal to or smaller than the threshold value, the process is executed to enable the hopping control 531 to change the hopping frequency (step 901). Then, the similar process is repeated.

Figure 13:
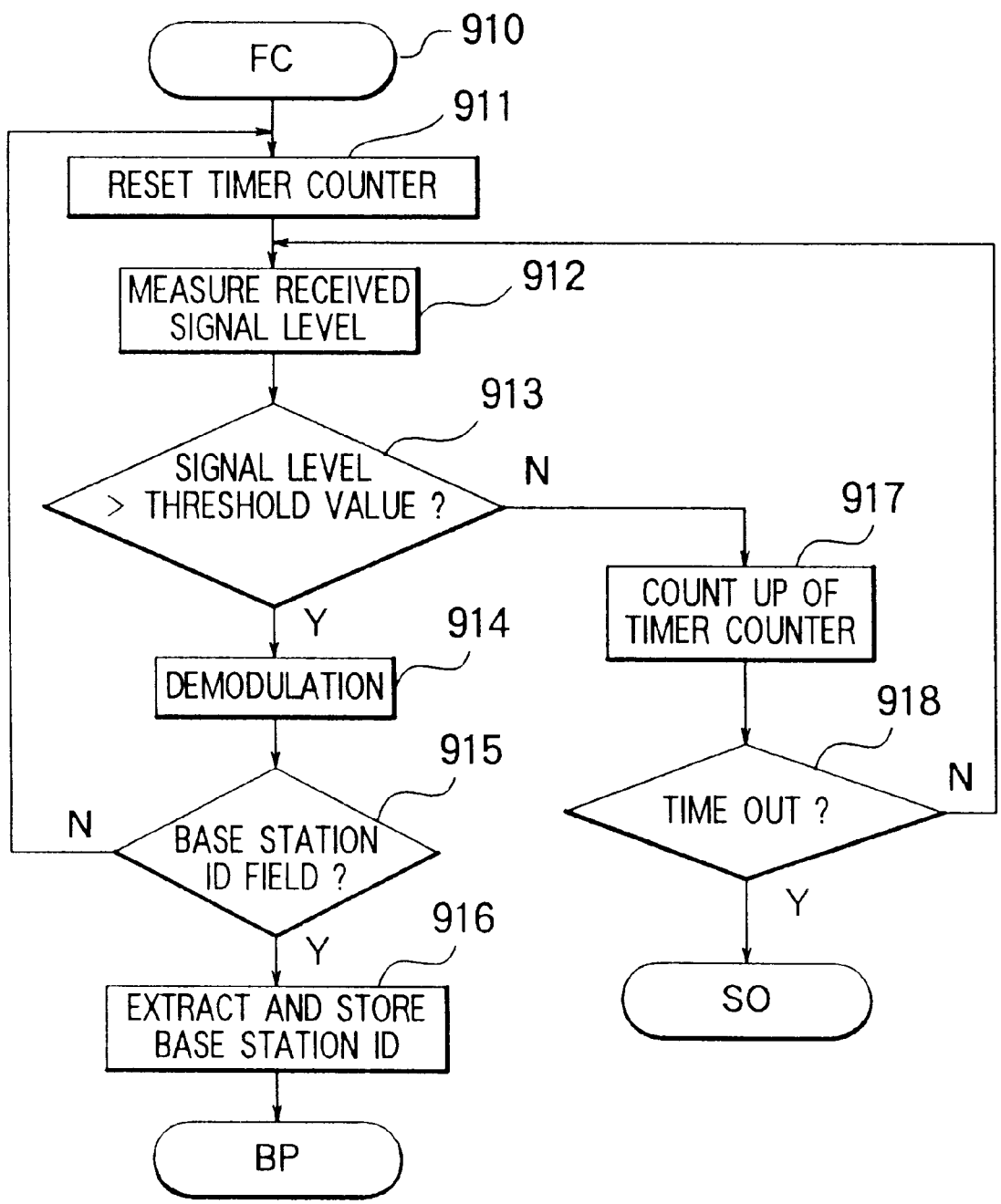
FIG. 13 is a flowchart showing a process in the state "FC"

FIG. 13 is a flowchart showing a program to be executed in the state "FC" 910.

At first, a timer counter is reset for measuring a timeout (step 911) and measure the level of the received signal (step 912). If the output of the comparator 528 indicates that the measured level is larger than the threshold value (step 913), it is checked whether or not a bit train demodulated by the circuit 151 (step 914) coincides with a pattern of a field flag (3) 709 standing for the head of the base station ID field (step 915).

If the bit train matches to the pattern of the field flag (3), the base station ID 710 following the field flag is extracted, stored and set to the register 522 (step 916). Then, the state is transited to "BP". If not matched, the process returns to the step 991 at which the foregoing operation is executed until the base station ID is extracted.

If it is determined that the measured level is smaller than the threshold value at the step 913, the timer counter is counted up (step 917). If it is not the timeout, the process returns to the step 912 (step 918). If it is the timeout, the state is transited to "SO".

Figure 14:
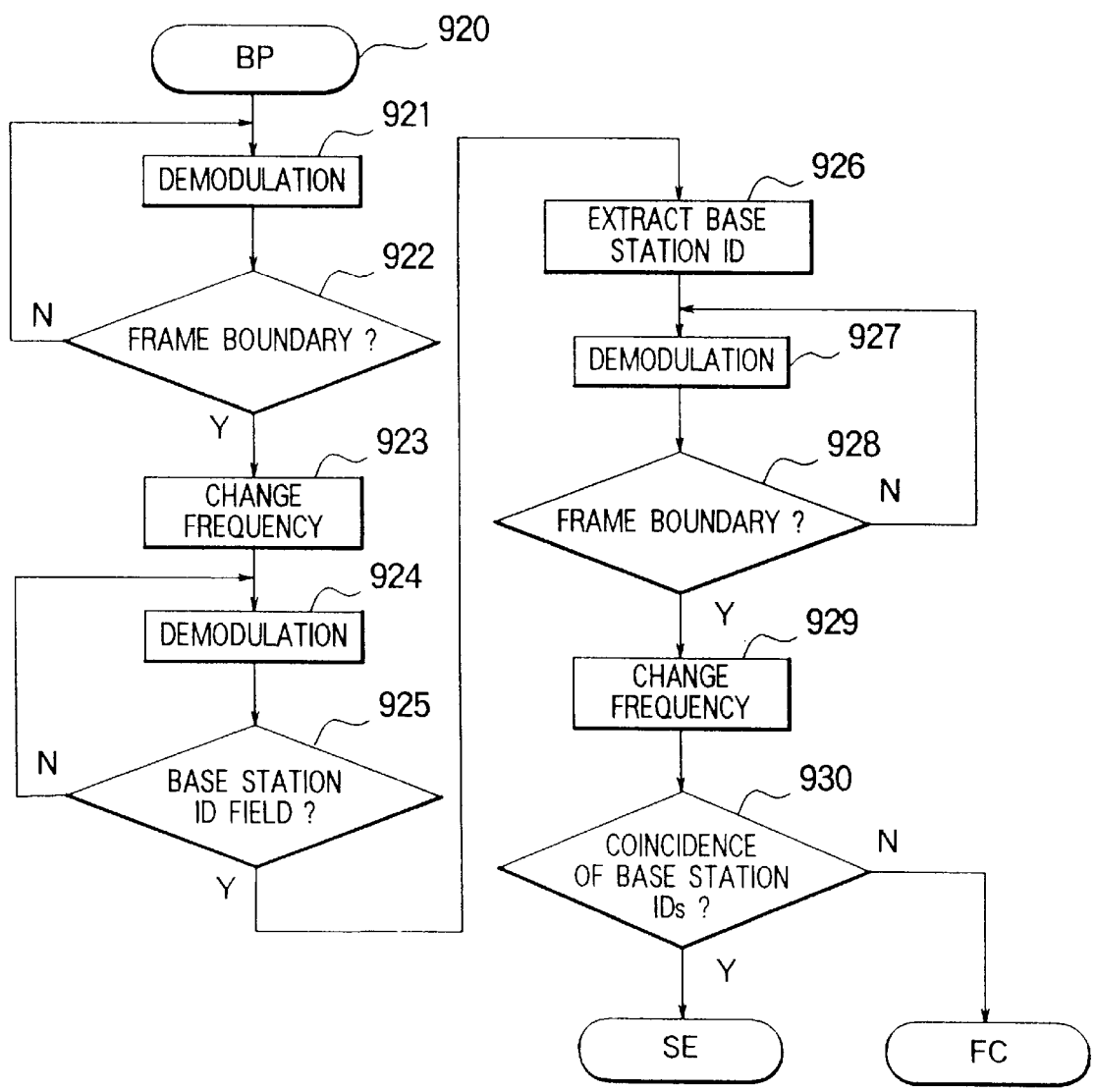
FIG. 14 is a flowchart showing a process in the state "BP"

FIG. 14 is a flowchart showing a program to be executed in the state "BP" 920.

At first, the demodulated output of the circuit 151 is read (step 921) so as to read the data from the head to the tail of the frame (frame boundary) (step 922).

If the frame boundary is detected, an instruction is given to the hopping control 531 so that the next hopping frequency may be read out of the frequency hopping pattern table 521 and set to the synthesizer 111 (step 923). The next hopping frequency is defined by the base station ID extracted in the state "FC". Then, the bit signal outputted from the demodulator 151 is checked and is read from the start to the base station ID field of the next frame (steps 924 to 925) so that the base station ID may be extracted (step 926).

If the boundary of the next frame is detected from the state of the demodulated bit signal (steps 927 to 928), an instruction is given to the hopping control 531 so that the hopping frequency of the next frame may be set to the synthesizer 111 (step 929). Next, it is determined whether or not the base station ID stored in the state "FC" is matched to the base station ID extracted this time (step 930). If matched, the state is transited to "SE". If not, it is transited to "FC".

Figure 15:
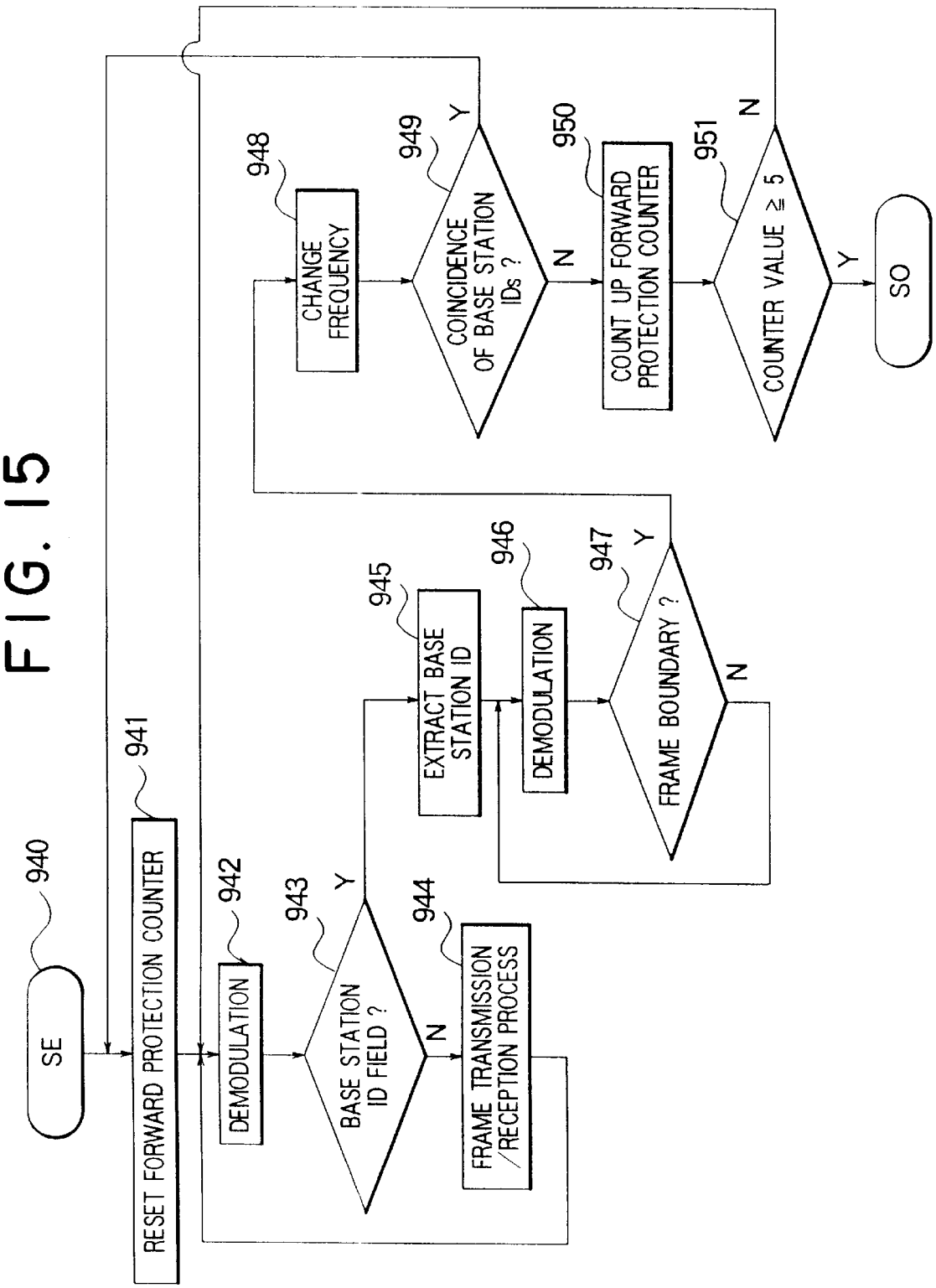
FIG. 15 is a flowchart showing a process in the state "SE"

FIG. 15 is a flowchart showing a program to be executed in the state "SE" (and "FP1" to "FP4") 940.

At first, the forward protection counter is reset (step 941). This counter is prepared in the memory for indicating the transition (step 941). If the counter has a value of "0", it stands for the state "SE". If it has a value of n (n=1 to 4), it stands for the state "FPn".

The output bit of the demodulator is read. The normal transmit/receive operation for the frame is executed until the base station ID field is found out (steps 942 to 944). If the base station ID field is found out, the base station ID is extracted (step 945). Next, it is checked whether or not the frame boundary is found out (steps 946 to 947). If it is detected, an instruction is given to the hopping control so that the hopping frequency of the next frame may be set to the synthesizer 111 (step 948).

Next, the base station ID stored in the state "FC" is compared with the base station ID extracted at this time (step 949). If both are matched to each other, the process returns to the step 941 for resetting the forward protection counter. Then, the similar operation to the foregoing is repeated. If not matched, the forward protection counter is counted up (step 950). If the count value n reaches a predetermined value ("5" in this embodiment) (step 951), the state is transited to "SO". If not (step "FPn"), the process returns to the step 942 from which the foregoing operation is repeated.

Figure 16:
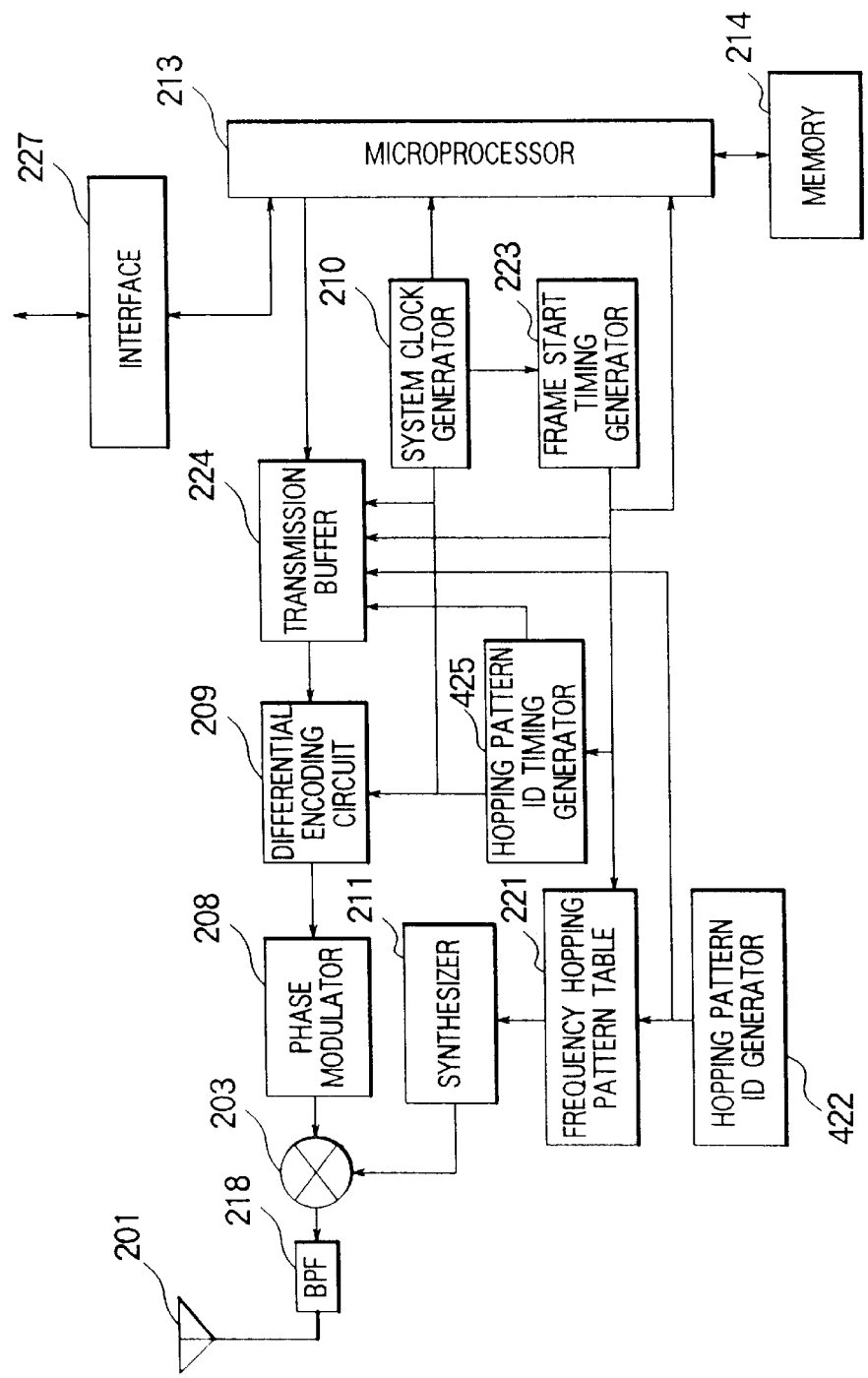
FIG. 16 is a block diagram showing an arrangement of a base station included in the communication system according to a third embodiment of the present invention.
Figure 17:
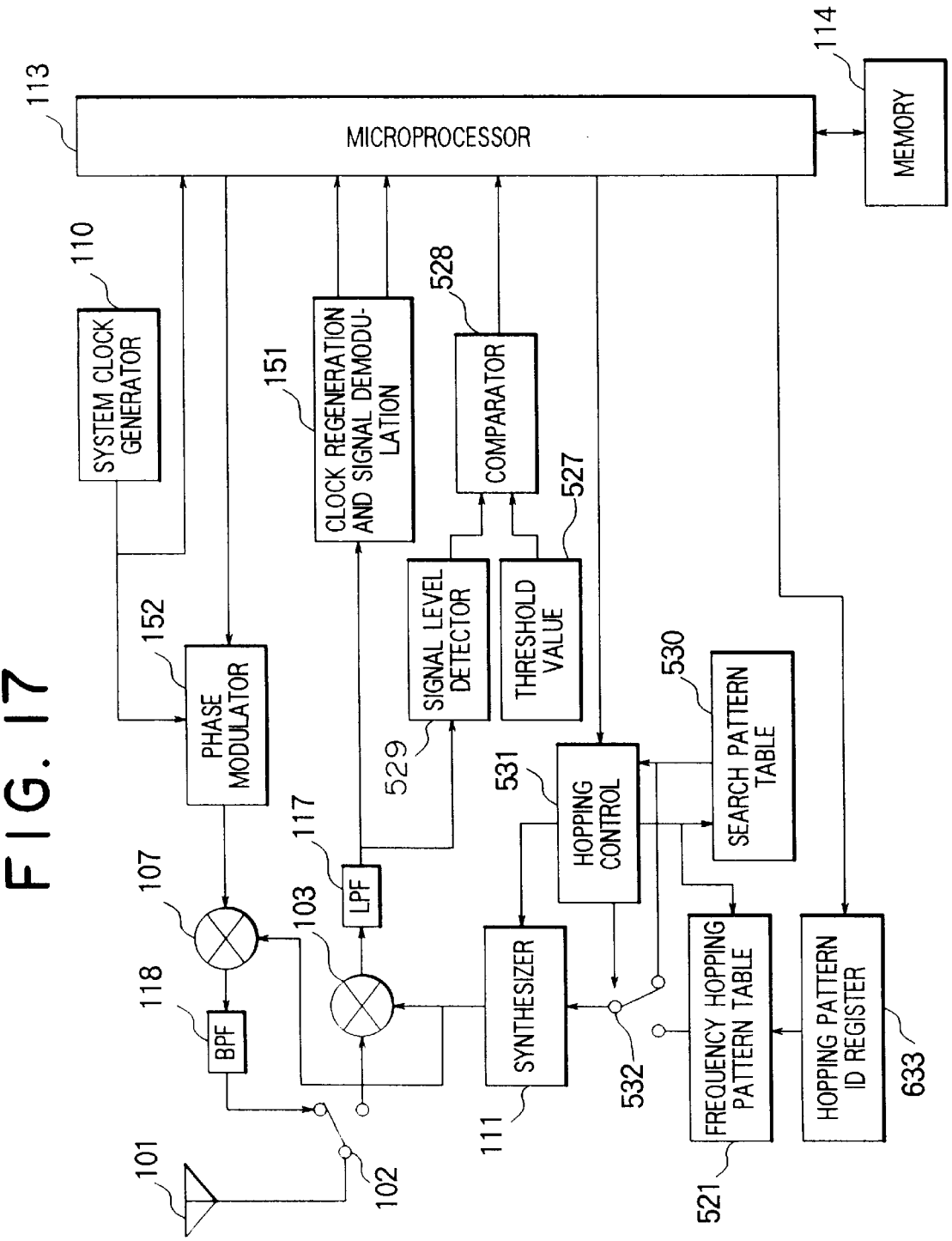
FIG. 17 is a block diagram showing an arrangement of a wireless communication station included in the communication system according to a third embodiment of the present invention.
Figure 18:
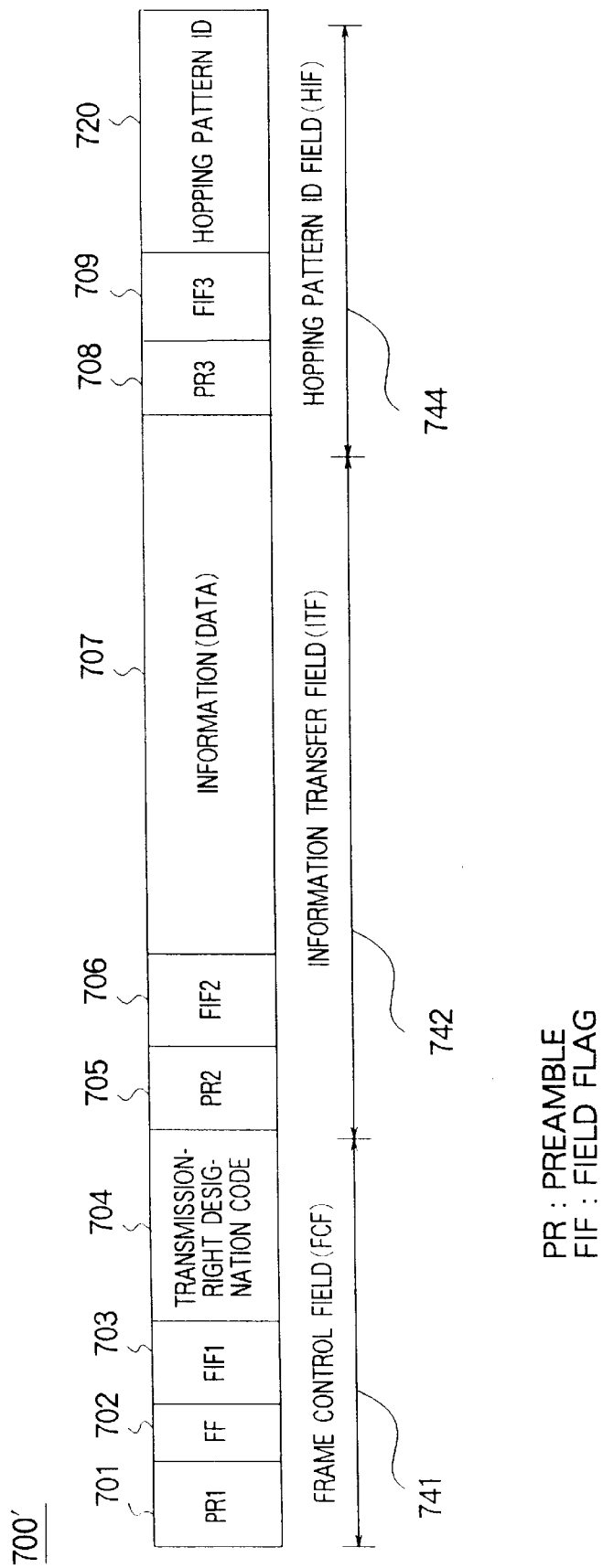
FIG. 18 is a view showing a frame structure used in the third embodiment.

In turn, the description will be oriented to a communication system according to the third embodiment of the present invention with reference to FIGS. 16 to 18.

In this embodiment, the used frame has a structure as shown in FIG. 18 in place of that shown in FIG. 6. The frame shown in FIG. 18 includes a hopping pattern ID field in place of the base station ID 710 shown in FIG. 6. In this hopping pattern ID field, the hopping pattern ID is set in place of the base station ID as in the foregoing embodiment.

The system according to the second embodiment has been arranged to derive a hopping pattern ID for the base station ID from the hopping pattern ID table and a hopping frequency for this hopping pattern ID from the frequency hopping pattern table. On the other hand, the system according to the third embodiment is arranged so that the base station may directly notify each mobile station of the hopping pattern ID with each frame. As such, unlike the second embodiment, the base station or each mobile station does not include the hopping pattern ID table.

The base station, as shown in FIG. 16, provides a hopping pattern ID generator 422 in place of the base station ID generator 222 and a hopping pattern ID timing generator 425 in place of the base station ID timing generator 225. The other arrangement of the base station is the same as that included in the second embodiment.

On the other hand, the mobile station, as shown in FIG. 17, provides a hopping pattern ID register 633 in place of the base station ID register 522. The other arrangement of the mobile station is the same as that included in the second embodiment shown in FIG. 2. The operation of the base station or the mobile station is common to that of the foregoing embodiment except that the hopping pattern ID table is not referred. Hence, no further description is given about the operation of the base station or the mobile station.

Figure 19:
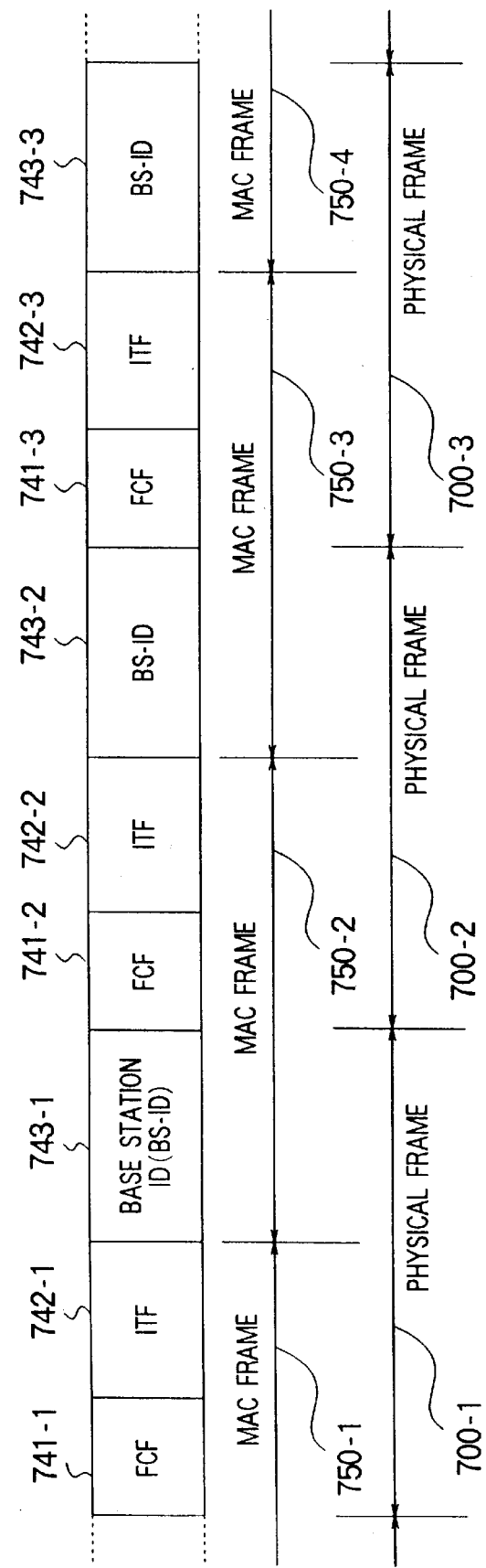
FIG. 19 is a view showing a relation between a MAC frame and a physical frame in the present invention.

FIG. 19 shows the frame structure in which physical frames 700-1 to 700-3 are applied to a MAC (Medial Access Control) frame 750 (750-1 to 750-4) in place of the frame structure 700 shown in FIG. 6.

The boundary between the MAC frames 750 is defined to be located at the head of the base station ID 743. The boundary is at the different location from the boundary between the physical frames 700. Normally, the base station ID, which is important to defining the operation of the overall MAC frame, is located at the head of the MAC frame. This makes it easy to realize the MAC protocol.

In this frame structure, on each physical frame 700, the base station ID field 743 is located at the tail of the frame. Hence, the aforementioned fast synchronization may apply to the physical frame.

A function of the terminal registration is an applied technique of locating the base station ID at the head of the MAC frame for making the MAC function more efficient. The function of the terminal registration is a function by which if a mobile terminal is newly moved to the cell managed by the base station, the mobile terminal (station) notifies the base station for taking responsibility of the cell of a request for registration for communicating with another terminal outside of the cell through the base station and the base station registers the information required for a routing database.

In order to implement this function, the MAC function of each mobile terminal operates to constantly monitor if the received frame is a frame created by the base station for taking responsibility of the mobile terminal or another frame created by another base station. If the frame is created by another base station, the communication system is required to have a function of immediately issuing a request for registering a terminal to a new base station.

The use of the MAC frame structure shown in FIG. 19 makes it possible for each mobile terminal to receive the base station ID field 743-1 at the head of the MAC frame 750-2, extract the field for checking whether or not the base station is changed. If the base station is changed, it is possible to issue a request for registering a terminal to the base station through the information transfer field 742-2 of the same MAC frame (next physical frame 700-2). With this function, the mobile terminal enables to communicate with the base station or another terminal through the base station with the MAC frames later than the next MAC frame 750-3.

What is claimed is:

1. In a communication system for communicating between a base station and a wireless mobile station through communication frames each having a predetermined format consisting of plural fields, each of said base and wireless mobile stations comprising:

oscillating means for generating a local oscillation signal;

hopping means for hopping said local oscillation signal outputted from said oscillating means from one frequency to another frequency among a predetermined sequence of hopping frequencies once a communication frame;

a transmission circuit for transmitting a wireless signal in one of said fields of one of said communication frames using said local oscillation signal outputted from said oscillating means as a carrier; and a receiving circuit for receiving a wireless signal in said one communication frame tuned to said local oscillating signal outputted from said oscillating means;

wherein said one communication frame includes a control field to transfer control information and an information field to transfer data information, said base station includes means for supplying said transmission circuit with a signal representing control information for designating a station which has a right to transmit a wireless signal in said information field of said one communication frame, based on a timing of said control field of said one communication frame, and said wireless mobile station includes control means for selecting either operation mode of receiving and transmission at said information field of said one communication frame depending upon said control information extracted from said control field of said one communication frame.

2. In a communication system for communicating between a base station and a wireless mobile station through communication frames having a predetermined format consisting of plural fields, said base station comprising:

means for generating a first signal representing frame control information to be transmitted at a first field of each of said communication frames and a second signal representing base station identification information to be transmitted at a second field of each of said communication frames, first oscillating means for generating a local oscillation signal, hopping means for hopping said local oscillation signal outputted from said first oscillating means from one frequency to another frequency among a predetermined sequence of hopping frequencies once a communication frame according to a predetermined hopping pattern, and transmitting means for transmitting said first and second signals generated from said signal generating means by using said local oscillation signal outputted from said first oscillating means as a carrier of a wireless signal;

said wireless mobile station comprising:

second oscillating means for generating a local oscillation signal, first hopping means for hopping said local oscillation signal outputted from said second oscillating means from one frequency to another frequency among a predetermined sequence of hopping frequencies a plurality of times a communication frame, second hopping means for hopping said local oscillation signal outputted from said second oscillating means from one frequency to another frequency among a predetermined sequence of hopping frequencies once a communication frame according to a hopping pattern specified in accordance with base station identification information, means for receiving a wireless signal in a communication frame by tuning to said local oscillation signal outputted from said second oscillating means, and hopping control means for monitoring an output of said receiving means while a frequency of said local oscillation signal outputted from said second oscillating means is being hopped by said first hopping means and for switching said first hopping means to said second hopping means when tuning of said wireless signal to said frequency of said local oscillation signal is detected.

3. A communication system as claimed in claim 2, wherein said wireless mobile station further comprises:

means for outputting a transmission signal of data information with a third field of plural fields of said communication frame; and transmitting means for transmitting said transmission signal of data information with the local oscillation signal outputted from said second oscillating means and being hopped from one frequency to another frequency among a predetermined sequence of hopping frequencies by said second hopping means as a carrier signal.

4. A communication system as claimed in claim 3, wherein said communication frame includes in sequence a first field for transmitting frame control information, a third field for transmitting data information, and a second field for transmitting base station identification information, and the first hopping means of said wireless mobile station hops the local oscillation signal outputted from said second oscillating means from one frequency to another frequency among a predetermined sequence of hopping frequencies so as to complete a hopping operation of all frequencies to be selected by said second hopping means during an interval which begins when the head of said communication frame is received and ends when the tail of said third field is received.

5. A communication system as claimed in claim 2, wherein said communication frame includes in sequence a first field for transmitting frame control information, a third field for transmitting frame control information, a third field for transmitting data information, and a second filed for transmitting base station identification information, and the first hopping means of said wireless mobile station hops the local oscillation signal outputted from said second oscillating means from one frequency to another frequency among a predetermined sequence of hopping frequencies so as to complete a hopping operation of all frequencies to be selected by said second hopping means during a time interval which begins when the head of said communication frame is received and ends when the tail of said third field is received.

6. In a communication system for communicating between a base station and a wireless mobile station through communication frames having a predetermined format consisting of plural fields, said base station comprising:

signal generating means for generating a first signal representing frame control information to be transmitted at a first field of each of said communication frames and a second signal representing a hopping pattern identifier to be transmitted at a second field of each of said communication frames, first oscillating means for generating a local oscillation signal and for hopping said local oscillation signal from one frequency to another frequency among a predetermined sequence of hopping frequencies once a communication frame according to a hopping pattern, and transmission means for transmitting said first and second signals generated from said signal generating means by using said local oscillation signal outputted from said first oscillating means as a carrier of a wireless signal;

said wireless mobile station comprising:

second oscillating means for generating a local oscillation signal, receiving means for receiving a wireless signal of a communication frame through an antenna by tuning to the local oscillation signal outputted from said second oscillating means, first hopping means for hopping the local oscillation signal outputted from said second oscillating means from one frequency to another frequency among a predetermined sequence of hopping frequencies a plurality of times a communication frame, second hopping means for hopping the local oscillation signal outputted from said second oscillating means from one frequency to another frequency among a predetermined sequence of hopping frequencies once a communication frame according to a hopping pattern specified in accordance with the hopping pattern identifier received at the second field of said communication frame, and means for monitoring an output of said receiving means while the local oscillation signal outputted from said second oscillating means is being hopped from one frequency to another frequency among a predetermined sequence of hopping frequencies by said first hopping means and for switching said first hopping means to said second hopping means when a carrier frequency of the wireless signal received at said antenna is detected to be tuned to a frequency of the local oscillation signal outputted from said second oscillating means, whereby said wireless mobile station receives communication frames while hopping from one frequency to another frequency among a predetermined sequence of hopping frequencies in synchronous to said hopping of frequencies in said base station.

7. A communication system as claimed in claim 6, wherein said wireless mobile station further comprises:

means for outputting a transmission signal of data information on the timing of a third field of plural fields of said communication frame and transmission means for transmitting said transmission signal of data information with the local oscillation signal from said second oscillating means and hopped from one frequency to another frequency among a predetermined sequence of hopping frequencies by said second hopping means as a carrier signal.

8. A communication system as claimed in claim 7, wherein said communication frame includes in sequence a first field for transmitting frame control information, a third field for transmitting data information, and a second field for transmitting a hopping pattern identifier, and the first hopping means of said wireless mobile station hops said local oscillation signal from one frequency to another frequency among a predetermined sequence of hopping frequencies so as to complete a hopping operation of all the frequencies to be selected by said second hopping means during a time interval which begins when the head of said communication frame is received and ends when the tail of said third field is received.

9. A communication system as claimed in claim 6, wherein said communication frame includes in sequence a first field for transmitting frame control information, a third field for transmitting data information, and a second field for transmitting a hopping pattern identifier, and the first hopping means of said wireless mobile station hops said local oscillation signal from one frequency to another frequency among a predetermined sequence of hopping frequencies so as to to complete a hopping operation of all the frequencies to be selected by said second hopping means during a time interval which begins when the head of said communication frame is received to when the tail of said third field is received.

10. A wireless mobile station for communicating with a base according to a frame format of a wireless communication frame consisting of a plurality of fields and for hopping a carrier frequency of said wireless communication frame in synchronous to said base station, said wireless station comprising:

oscillating means for outputting a local oscillation signal;

a transmission circuit for transmitting a transmission signal according to the frame format of said wireless communication frame by using the local oscillation signal as a carrier of a wireless signal through an antenna;

a receiving circuit for receiving a wireless signal in a communication frame through said antenna by tuning to the local oscillation signal outputted from said oscillating means;

control means coupled with said transmission circuit and said receiving circuit for treating said communication frame to have a frame format corresponding to a media access control(MAC) layer frame which includes a data information transfer field at a location after said control field for transferring base station identification information; and frequency hopping means for hopping the local oscillation signal outputted from said oscillating means from one frequency to another frequency among a predetermined sequence of hopping frequencies once a communication frame according to a hopping pattern in synchronous to said hopping of frequencies in said base station, said local oscillation signal being hopped from one frequency to another frequency of a predetermined sequence of hopping frequencies at a timing immediately after said control field for transferring said base station identifier in each MAC layer frame.

11. In a communication system for communicating between a base station and a wireless mobile station through communication frames each having a predetermined format consisting of plural fields, each of said base and wireless mobile stations comprising:

an oscillator for generating a local oscillation signal;

a hopping circuit for hopping said local oscillation signal outputted from said oscillator from one frequency to another frequency among a predetermined sequence of hopping frequencies once a communication frame;

a transmission circuit for transmitting a wireless signal in one of said fields of one of said communication frames using said local oscillation signal outputted from said oscillator as a carrier signal; and a receiving circuit for receiving a wireless signal in said one communication frame tuned to said local oscillating signal outputted from said oscillator;

wherein said one communication frame includes a control field to transfer control information and an information field to transfer data information, said base station includes a supply circuit for supplying said transmission circuit with a signal representing control information for designating a station which has a right to transmit a wireless signal in said information field of said one communication frame based on a timing of said control field of said communication frame, and said wireless mobile station includes a control circuit for selecting either operation mode of receiving and transmission at said information field of said one communication frame depending upon said control information extracted from said control field of a received communication frame.

12. In a communication system for communicating between a base station and a wireless mobile station through communication frames having a predetermined format consisting of plural fields, said base station comprising:

a signal generator for generating a first signal representing frame control information to be transmitted at a first field of each of said communication frames and a second signal representing base station identification information to be transmitted at a second field of each of said communication frames, a first oscillator for generating a local oscillation signal, a first hopping circuit for hopping said local oscillation signal outputted from said first oscillator from one frequency to another frequency among a predetermined sequence of hopping frequencies once a communication frame according to a predetermined hopping pattern, and a transmitter for transmitting said first and second signals generated from said signal generator by using said local oscillation signal outputted from said first oscillator as a carrier of a wireless signal;

said wireless mobile station comprising:

a second oscillator for generating a local oscillation signal, a first hopping circuit for hopping said local oscillation signal outputted from said second oscillator from one frequency to another frequency among a predetermined sequence of hopping frequencies a plurality of times a communication frame, a second hopping circuit for hopping said local oscillation signal outputted from said second oscillator from one frequency to another frequency among a predetermined sequence of hopping frequencies once a communication frame according to a hopping pattern specified in accordance with base station identification information, a receiving circuit for receiving a wireless signal in a communication frame by tuning to said local oscillation signal outputted from said second oscillator, and a hopping control circuit for monitoring an output of said receiving circuit while said local oscillation signal outputted from said second oscillating means is being hopped from one frequency to another frequency among a predetermined sequence of hopping frequencies by said first hopping circuit and for switching said first hopping circuit to said second hopping circuit when tuning of said wireless signal to said frequency of said local oscillation signal is detected.

13. A communication system as claimed in claim 12, wherein said wireless mobile station further comprises:
an output circuit for outputting a transmission signal of data information with a third field of plural fields of said communication frame; and
a transmitter for transmitting said transmission signal of data information with the local oscillation signal outputted from said second oscillator and being hopped from one frequency to another frequency among a predetermined sequence of hopping frequencies by said second hopping circuit as a carrier signal.

14. A communication system as claimed in claim 13, wherein said communication frame includes in sequence a first field for transmitting frame control information, a third field for transmitting data information, and a second field for transmitting base station identification information, and the first hopping circuit of said wireless mobile station hops the local oscillation signal outputted from said second oscillator from one frequency to another frequency among a predetermined sequence of hopping frequencies so as to complete a hopping operation of all frequencies to be selected by said second hopping circuit during an interval which begins when the head of said communication frame is received and ends when the tail of said third field is received.

15. A communication system as claimed in claim 12, wherein said communication frame includes in sequence a first field for transmitting frame control information, a third field for transmitting frame control information, a third field for transmitting data information, and a second filed for transmitting base station identification information, and the first hopping circuit of said wireless mobile station hops the local oscillation signal outputted from said second oscillator from one frequency to another frequency among a predetermined sequence of hopping frequencies so as to complete a hopping operation of all frequencies to be selected by said second hopping circuit during a time interval which begins when the head of said communication frame is received and ends when the tail of said third field is received.

16. In a communication system for communicating between a base station and a wireless mobile station through communication frames having a predetermined format consisting of plural fields,
said base station comprising:
a signal generator for generating a first signal representing frame control information to be transmitted at a first field of each of said communication frames and a second signal representing a hopping pattern identifier to be transmitted at a second field of each of said communication frames,
a first oscillator for generating a local oscillation signal and for hopping said local oscillation signal from one frequency to another frequency among a predetermined sequence of hopping frequencies once a communication frame according to a hopping pattern, and
a transmitter for transmitting said first and second signals generated from said signal generator by using said local oscillation signal outputted from said first oscillator as a carrier of a wireless signal;
said wireless mobile station comprising:
a second oscillator for generating a local oscillation signal,
a receiver for receiving a wireless signal of a communication frame through an antenna by tuning to the local oscillation signal outputted from said second oscillator,
a first hopping circuit for hopping the local oscillation signal outputted from said second oscillator from one frequency to another frequency among a predetermined sequence of hopping frequencies a plurality of times a communication frame,
a second hopping circuit for hopping the local oscillation signal outputted from said second oscillator from one frequency to another frequency among a predetermined sequence of hopping frequencies once a communication frame according to a hopping pattern specified in accordance with the hopping pattern identifier received at the second field of said communication frame, and
a monitor circuit for monitoring an output of said receiver while the local oscillation signal outputted from said second oscillator is being hopped from one frequency to another frequency among a predetermined sequence of hopping frequencies by said first hopping circuit and for switching said first hopping circuit to said second hopping circuit when a carrier frequency of the wireless signal received at said antenna is detected to be tuned to a frequency of the local oscillating signal outputted from said second oscillator,
whereby said wireless mobile station receives communication frames while hopping from one frequency to another frequency among a predetermined sequence of hopping frequencies in synchronous to said hopping of frequencies in said base station.

17. A communication system as claimed in claim 16, wherein said wireless mobile station further comprises:
an output circuit for outputting a transmission signal of data information on the timing of a third field of plural fields of said communication frame and a transmitter for transmitting said transmission signal of data information with the local oscillation signal from said second oscillator and hopped from one frequency to another frequency among a predetermined sequence of hopping frequencies by said second hopping circuit as a carrier signal.

18. A communication system as claimed in claim 17, wherein said communication frame includes in sequence a first field for transmitting frame control information, a third field for transmitting data information, and a second field for transmitting a hopping pattern identifier, and the first hopping circuit of said wireless mobile station hops said local oscillation signal from one frequency to another frequency among a predetermined sequence of hopping frequencies so as to complete a hopping operation of all the frequencies to be selected by said second hopping circuit during a time interval which begins when the head of said communication frame is received and ends when the tail of said third field is received.

19. A communication system as claimed in claim 16, wherein said communication frame includes in sequence a first field for transmitting frame control information, a third field for transmitting data information, and a second field for transmitting a hopping pattern identifier, and the first hoping circuit of said wireless mobile station hopes said local oscillation signal from one frequency to another frequency among a predetermined sequence of hopping frequencies so as to complete a hopping operation of all the frequencies to be selected by said second hopping circuit during a time interval which begins when the head of said communication frame is received to when the tail of said third field is received.

20. A wireless mobile station for communicating with a base according to a frame format of a wireless communication frame consisting of a plurality of fields and for hopping a carrier frequency of said wireless communication frame in synchronous to said base station, said wireless station comprising:

- a oscillator for outputting a local oscillation signal;
- a transmission circuit for transmitting a transmission signal according to the frame format of said wireless communication frame by using the local oscillation signal as a carrier of a wireless signal through an antenna;
- a receiving circuit for receiving a wireless signal in a communication frame through said antenna by tuning to the local oscillation signal outputted from said oscillator;
- a control circuit coupled with said transmission circuit and said receiving circuit for treating said communication frame so as to have such a frame format corresponding to a media access control (MAC) layer frame which includes a data information transfer field at a location after said control field for transferring base station identification information; and
- a frequency hopping circuit for hopping the local oscillation signal outputted from said oscillating means from one frequency to another frequency among a predetermined sequence of hopping frequencies once a communication frame according to a hopping pattern in synchronous to said hopping of frequencies in said base station, said local oscillation signal being hopped from one frequency to another frequency among a predetermined sequence of hopping frequencies at a timing immediately after said control field for transferring said base station identifier in each MAC layer frame.

* * * * *